United States Patent
Xu et al.

(10) Patent No.: US 11,526,051 B2
(45) Date of Patent: Dec. 13, 2022

(54) DISPLAYS WITH DIRECT-LIT BACKLIGHT UNITS

(71) Applicant: Apple Inc., Cupertino, CA (US)

(72) Inventors: Daming Xu, Santa Clara, CA (US); Wei Lv, San Jose, CA (US); Pee Khiam So, San Jose, CA (US); Wenyong Zhu, Saratoga, CA (US); Rong Liu, Sunnyvale, CA (US); Victor H. Yin, Cupertino, CA (US); Mookyung Son, Cupertino, CA (US); Jun Qi, San Jose, CA (US); Yufeng Yan, Santa Clara, CA (US); Shaofeng Liu, San Jose, CA (US); Thomas O. Henry, San Francisco, CA (US); Suraj P. Gorkhali, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/409,458

(22) Filed: Aug. 23, 2021

(65) Prior Publication Data
US 2022/0334431 A1 Oct. 20, 2022

Related U.S. Application Data

(60) Provisional application No. 63/175,723, filed on Apr. 16, 2021, provisional application No. 63/175,716, filed on Apr. 16, 2021, provisional application No. 63/175,730, filed on Apr. 16, 2021.

(51) Int. Cl.
*G02F 1/13357* (2006.01)

(52) U.S. Cl.
CPC .. *G02F 1/133603* (2013.01); *G02F 1/133605* (2013.01); *G02F 1/133606* (2013.01); *G02F 1/133608* (2013.01); *G02F 1/133611* (2013.01); *G02F 1/133621* (2013.01)

(58) Field of Classification Search
CPC ........ G02F 1/133603; G02F 1/133605; G02F 1/133606; G02F 1/133608; G02F 1/133611; G02F 1/133621
See application file for complete search history.

(56) References Cited

U.S. PATENT DOCUMENTS

| | | | |
|---|---|---|---|
| 5,265,792 | A | 11/1993 | Harrah et al. |
| 5,811,925 | A | 9/1998 | Anandan et al. |
| 7,201,497 | B2 | 4/2007 | Weaver, Jr. et al. |
| 8,619,363 | B1 | 12/2013 | Coleman |
| 9,341,888 | B2 | 5/2016 | Takeuchi et al. |

(Continued)

FOREIGN PATENT DOCUMENTS

WO 2012014600 A1 2/2012

*Primary Examiner* — Britt D Hanley
(74) *Attorney, Agent, or Firm* — Treyz Law Group, P.C.; Joseph F. Guihan

(57) ABSTRACT

A display may have a pixel array such as a liquid crystal pixel array. The pixel array may be illuminated with backlight illumination from a direct-lit backlight unit. The backlight unit may include an array of light-emitting diodes on a printed circuit board. The backlight unit may include first, second, and third light spreading layers formed over the array of light-emitting diodes. A color conversion layer may be formed over the first, second, and third light spreading layers. First and second brightness enhancement films may be formed over the color conversion layer.

20 Claims, 37 Drawing Sheets

(56) References Cited

U.S. PATENT DOCUMENTS

| | | |
|---|---|---|
| 9,625,641 B2 | 4/2017 | Gourlay |
| 9,747,819 B2 | 8/2017 | Ye et al. |
| 10,041,653 B2 | 8/2018 | Ahn et al. |
| 10,490,143 B2 | 11/2019 | Kumamoto et al. |
| 10,613,389 B2 | 4/2020 | Liu et al. |
| 10,802,336 B2 | 10/2020 | Liu et al. |
| 10,901,260 B2 | 1/2021 | Liu et al. |
| 11,009,745 B2 | 5/2021 | Liu et al. |
| 2005/0001537 A1 | 1/2005 | West et al. |
| 2005/0127375 A1 | 6/2005 | Erchak et al. |
| 2005/0140860 A1 | 6/2005 | Olczak |
| 2006/0082698 A1 | 4/2006 | Ko et al. |
| 2007/0200974 A1 | 8/2007 | Daiku |
| 2009/0009050 A1 | 1/2009 | Kanade et al. |
| 2009/0059119 A1 | 3/2009 | Ohta et al. |
| 2009/0135331 A1 | 5/2009 | Kawase |
| 2010/0265694 A1 | 10/2010 | Kim et al. |
| 2011/0285923 A1* | 11/2011 | Yokota ............ G02F 1/133608 348/739 |
| 2012/0075549 A1 | 3/2012 | Lin et al. |
| 2012/0224378 A1 | 9/2012 | Koike et al. |
| 2015/0219310 A1 | 8/2015 | Lee et al. |
| 2015/0293391 A1 | 10/2015 | Yanai et al. |
| 2016/0363708 A1 | 12/2016 | You et al. |
| 2017/0139100 A1 | 5/2017 | Nam et al. |
| 2017/0199451 A1 | 7/2017 | Akiyama |
| 2017/0207422 A1 | 7/2017 | Inoue |
| 2017/0269431 A1 | 9/2017 | Teragawa |
| 2017/0285781 A1* | 10/2017 | Degner ............... H01H 25/041 |
| 2017/0299792 A1 | 10/2017 | Oh et al. |
| 2018/0062049 A1 | 3/2018 | Otsuka et al. |
| 2018/0080625 A1 | 3/2018 | Yamada et al. |
| 2018/0081096 A1 | 3/2018 | Claes |
| 2018/0122613 A1 | 5/2018 | Sadasivan et al. |
| 2018/0182940 A1 | 6/2018 | Yamamoto |
| 2019/0129249 A1 | 5/2019 | Lee et al. |
| 2019/0187518 A1 | 6/2019 | Her et al. |
| 2019/0204678 A1 | 7/2019 | Hosoki |
| 2019/0251897 A1 | 8/2019 | Toyama et al. |
| 2019/0258115 A1 | 8/2019 | Kyoukane et al. |
| 2019/0285943 A1 | 9/2019 | Liu et al. |
| 2019/0285950 A1 | 9/2019 | Liu et al. |
| 2020/0064689 A1 | 2/2020 | Watanabe et al. |
| 2020/0271994 A1 | 8/2020 | Zha et al. |

\* cited by examiner

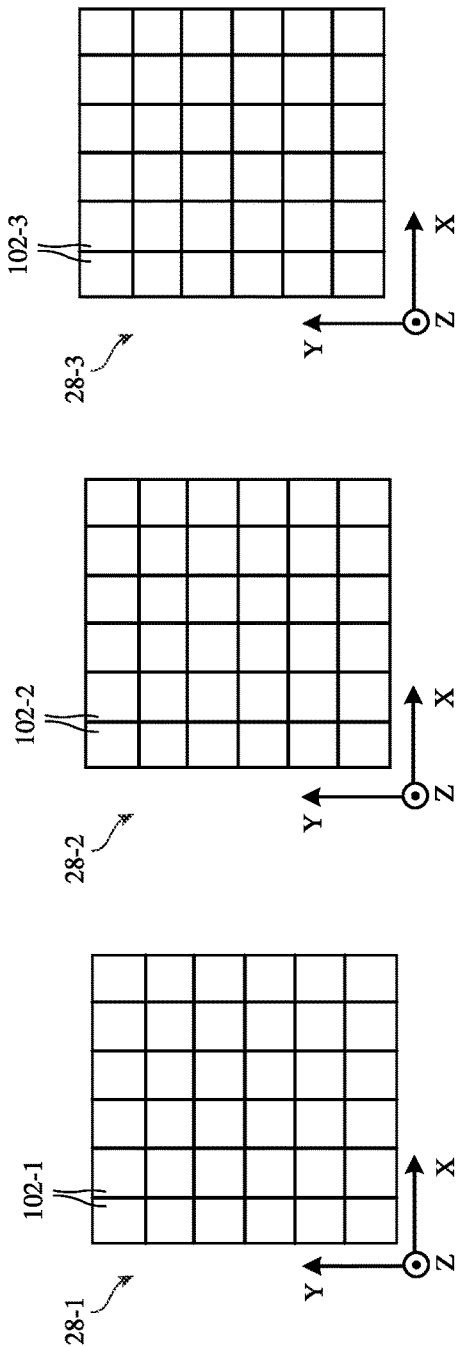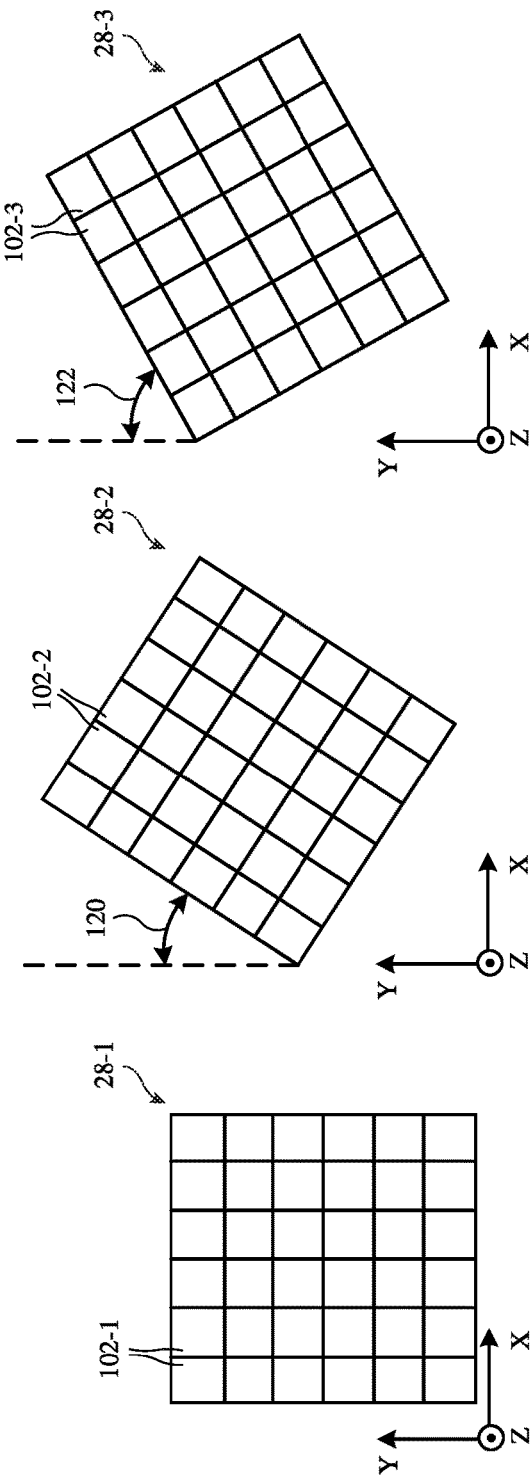

DISPLAYS WITH DIRECT-LIT BACKLIGHT UNITS

This application claims the benefit of provisional patent application No. 63/175,723, filed Apr. 16, 2021, provisional patent application No. 63/175,730, filed Apr. 16, 2021, and provisional patent application No. 63/175,716, filed Apr. 16, 2021, which are hereby incorporated by reference herein in their entireties.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination.

Direct-lit backlight units have arrays of light-emitting diodes that emit light vertically through the display. If care is not taken, however, a direct-lit backlight may be bulky or may produce non-uniform backlight illumination.

SUMMARY

A display may have a pixel array such as a liquid crystal pixel array. The pixel array may be illuminated with backlight illumination from a direct-lit backlight unit. The backlight unit may include an array of light-emitting diodes on a printed circuit board.

The backlight unit may include first, second, and third light spreading layers formed over the array of light-emitting diodes. A color conversion layer may be formed over the first, second, and third light spreading layers. First and second brightness enhancement films may be formed over the color conversion layer.

The color conversion layer may include scattering dopants. The color conversion layer may include an anti-static layer. The color conversion layer may include a low-index layer. Yellow and/or clear ink may be patterned on one of the brightness enhancement films.

One of the optical films in the backlight unit such as the color conversion layer may be attached to a chassis along one edge of the printed circuit board. Along the other edge of the printed circuit board, electronic components may be formed in an inactive area. Standoffs may be included in the inactive area to protect the electronic components. A stainless steel stiffener may wrap around the edge of the printed circuit board with the electronic components.

The printed circuit board may have a high reflectivity to increase the efficiency of the display.

BRIEF DESCRIPTION OF THE DRAWINGS

FIGS. 7A-7C are top views of illustrative light spreading layers showing how pyramidal protrusions in each light spreading layer may have the same orientation in accordance with an embodiment.

FIGS. 8A-8C are top views of illustrative light spreading layers showing how pyramidal protrusions in each light spreading layer may be rotated relative to the other light spreading layers in accordance with an embodiment.

DETAILED DESCRIPTION

Figure 1:
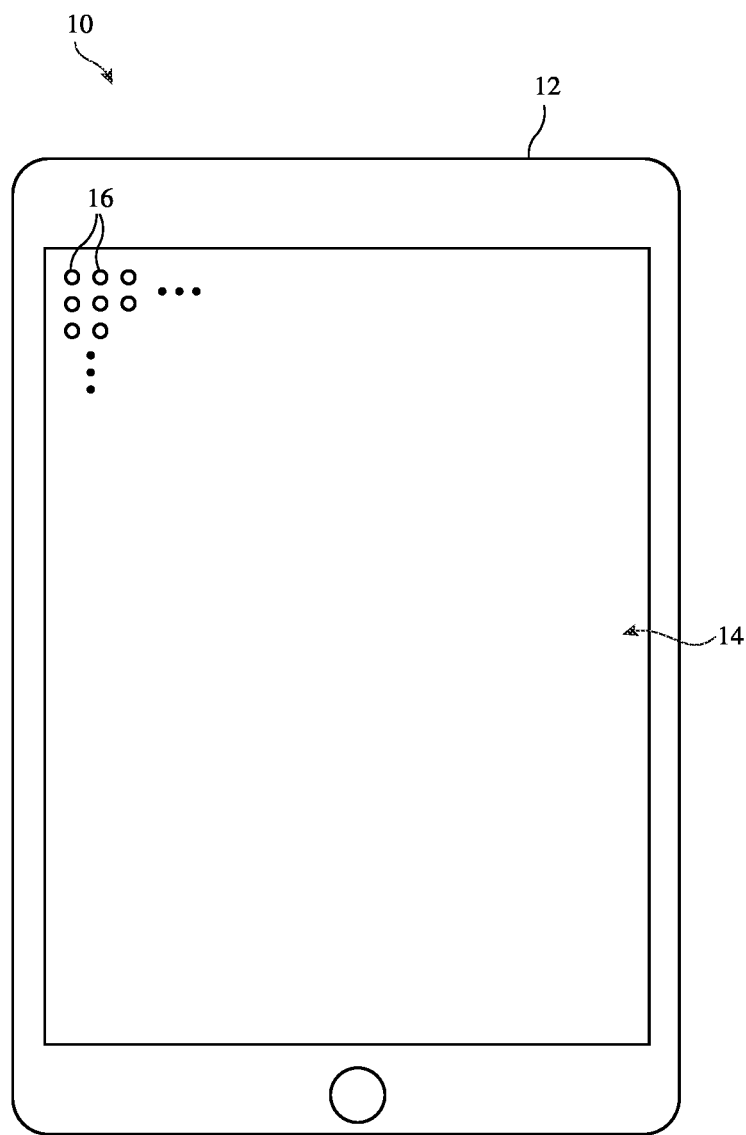
FIG. 1 is a diagram of an illustrative electronic device having a display in accordance with an embodiment.

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand, may have multiple parts (e.g., housing portions that move relative to each other to form a laptop computer or other device with movable parts), may have the shape of a cellular telephone or tablet computer, and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
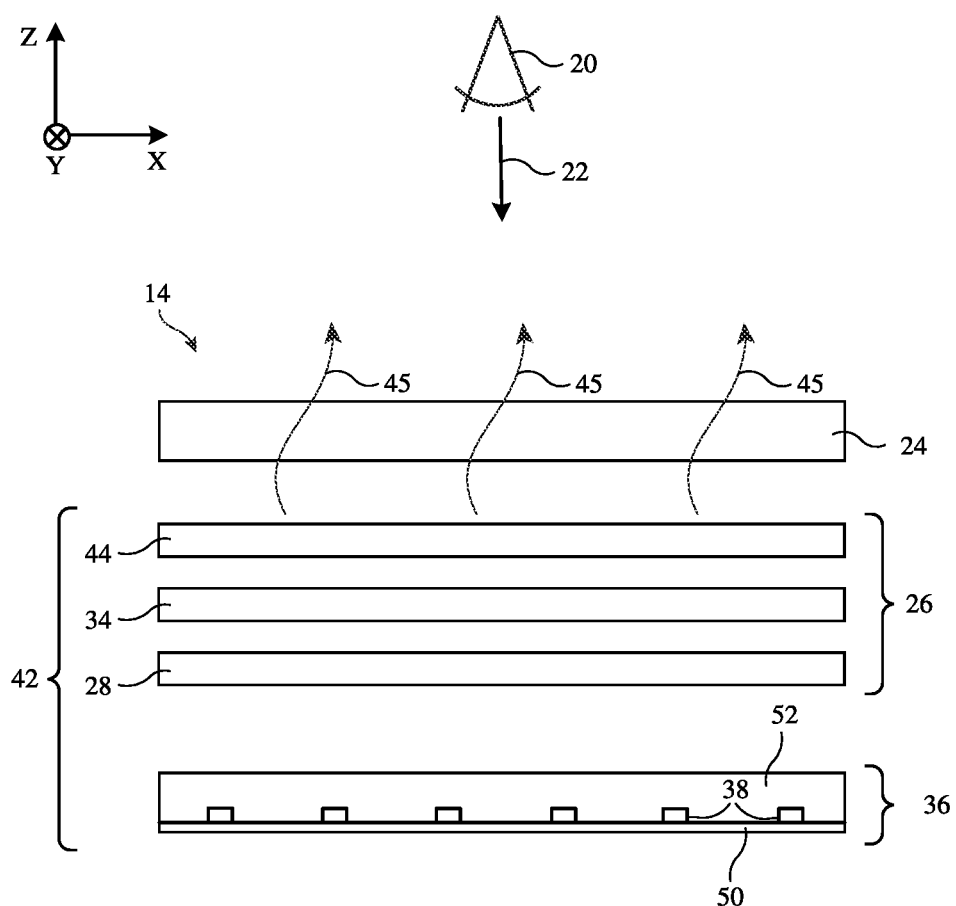
FIG. 2 is a cross-sectional side view of an illustrative display in accordance with an embodiment.

As shown in FIG. 2, display 14 may include a pixel array such as pixel array 24. Pixel array 24 may include an array of pixels such as pixels 16 of FIG. 1 (e.g., an array of pixels having rows and columns of pixels 16). Pixel array 24 may be formed from a liquid crystal display module (sometimes referred to as a liquid crystal display or liquid crystal layers) or other suitable pixel array structures. A liquid crystal display for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of display 14, images may be displayed on pixel array 24. Backlight unit 42 (which may sometimes be referred to as a backlight, backlight layers, backlight structures, a backlight module, a backlight system, etc.) may be used in producing backlight illumination 45 that passes through pixel array 24. This illuminates any images on pixel array 24 for viewing by a viewer such as viewer 20 who is viewing display 14 in direction 22.

Backlight unit 42 may include a plurality of optical films 26 formed over light-emitting diode array 36. Light-emitting diode array 36 may contain a two-dimensional array of light sources such as light-emitting diodes 38 that produce backlight illumination 45. Light-emitting diodes 38 may, as an example, be arranged in rows and columns and may lie in the X-Y plane of FIG. 2. Light-emitting diodes 38 may be mounted on printed circuit board 50 (sometimes referred to as substrate 50) and may be encapsulated by encapsulant 52 (sometimes referred to as transparent encapsulant 52, encapsulant slab 52, etc.). The slab of encapsulant 52 may be formed continuously across the LED array and may have a planar upper surface.

Light-emitting diodes 38 may be controlled in unison by control circuitry in device 10 or may be individually controlled (e.g., to implement a local dimming scheme that helps improve the dynamic range of images displayed on pixel array 24). The light produced by each light-emitting diode 38 may travel upwardly along dimension Z through optical films 26 before passing through pixel array 24.

Optical films 26 may include films such as one or more light spreading layers 28, color conversion layer 34, one or more brightness enhancement films 44 (sometimes referred to as collimating layers 44), and/or other optical films.

Light-emitting diodes 38 may emit light of any suitable color (e.g., blue, red, green, white, etc.). With one illustrative configuration described herein, light-emitting diodes 38 emit blue light. To help provide uniform backlight across backlight unit 42, light from light-emitting diodes 38 may be spread by light spreading layer 28. The light from the at least one light spreading layer 28 then passes through color conversion layer 34 (which may sometimes be referred to as a photoluminescent layer).

Color conversion layer 34 may convert the light from LEDs 38 from a first color to a different color. For example, when the LEDs emit blue light, color conversion layer 34 may include a phosphor layer (e.g., a layer of white phosphor material or other photoluminescent material) that converts blue light into white light. If desired, other photoluminescent materials may be used to convert blue light to light of different colors (e.g., red light, green light, white light, etc.). For example, one layer 34 may have a phosphor layer that includes quantum dots that convert blue light into red and green light (e.g., to produce white backlight illumination that includes, red, green, and blue components, etc.). Configurations in which light-emitting diodes 38 emit white light (e.g., so that layer 34 may be omitted, if desired) may also be used.

By the time light from light-emitting diodes 38 reaches the one or more brightness enhancement films 44, the light has been converted from blue to white and has been homogenized (e.g., by the light spreading layer). Brightness enhancement films 44 may then collimate off-axis light to increase the brightness of the display for a viewer viewing the display in direction 22.

Figure 3:
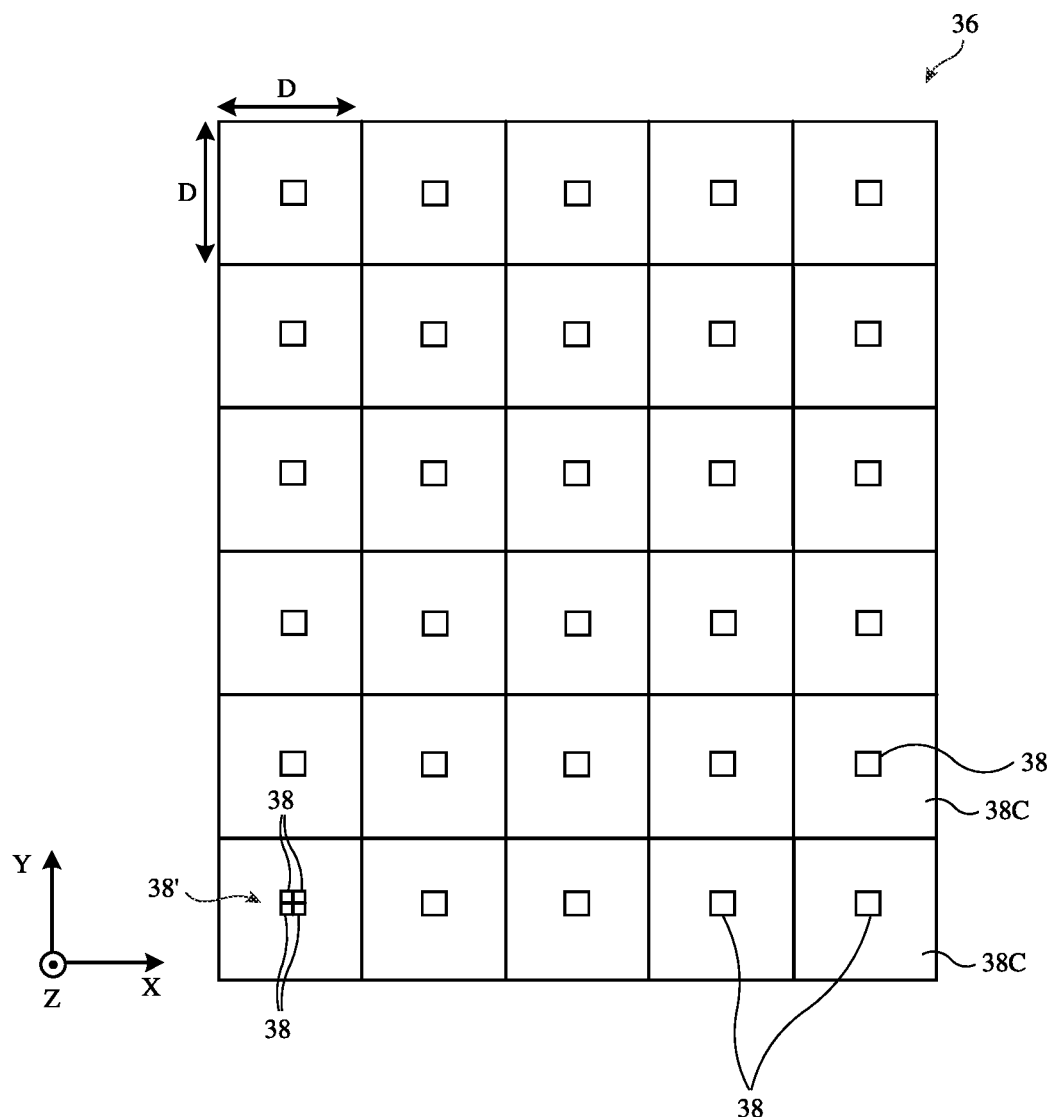
FIG. 3 is a top view of an illustrative light-emitting diode array for a direct-lit backlight unit in accordance with an embodiment.

FIG. 3 is a top view of an illustrative light-emitting diode array for backlight 42. As shown in FIG. 3, light-emitting diode array 36 may contain rows and columns of light-emitting diodes 38. Each light-emitting diode 38 may be associated with a respective cell (tile area) 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, less than 1 mm, less than 0.1 mm, greater than 0.01 mm, greater than 0.1 mm, or any other desired size. If desired, hexagonally tiled arrays and arrays with light-emitting diodes 38 that are organized in other suitable array patterns may be used. In arrays with rectangular cells, each cell may have sides of equal length (e.g., each cell may have a square outline in which four equal-length cell edges surround a respective light-emitting diode) or each cell may have sides of different lengths (e.g., a non-square rectangular shape). The configuration of FIG. 3 in which light-emitting diode array 36 has rows and columns of square light-emitting diode regions such as cells 38C is merely illustrative.

If desired, each cell 38C may have a light source that is formed form an array of light-emitting diode dies (e.g., multiple individual light-emitting diodes 38 arranged in an array such as a 2×2 cluster of light-emitting diodes at the center of each cell 38C). For example, light source 38' in the leftmost and lowermost cell 38C of FIG. 3 has been formed from a 2×2 array of light-emitting diodes 38 (e.g., four separate light-emitting diode dies). In general, each cell 38C may include a light source 38' with a single light-emitting diode 38, a pair of light-emitting diodes 38, 2-10 light-emitting diodes 38, at least two light-emitting diodes 38, at least 4 light-emitting diodes 38, at least eight light-emitting diodes 38, fewer than five light-emitting diodes 38, or other suitable number of light-emitting diodes. Illustrative configurations in which each cell 38C has a single light-emitting diode 38 may sometimes be described herein as an example. This is, however, merely illustrative. Each cell 38C may have a light source 38 with any suitable number of one or more light-emitting diodes 38. The diodes 38 in light-emitting diode array 36 may be mounted on a printed circuit board substrate (50) that extends across array 36 or may be mounted in array 36 using other suitable arrangements.

Figure 4:
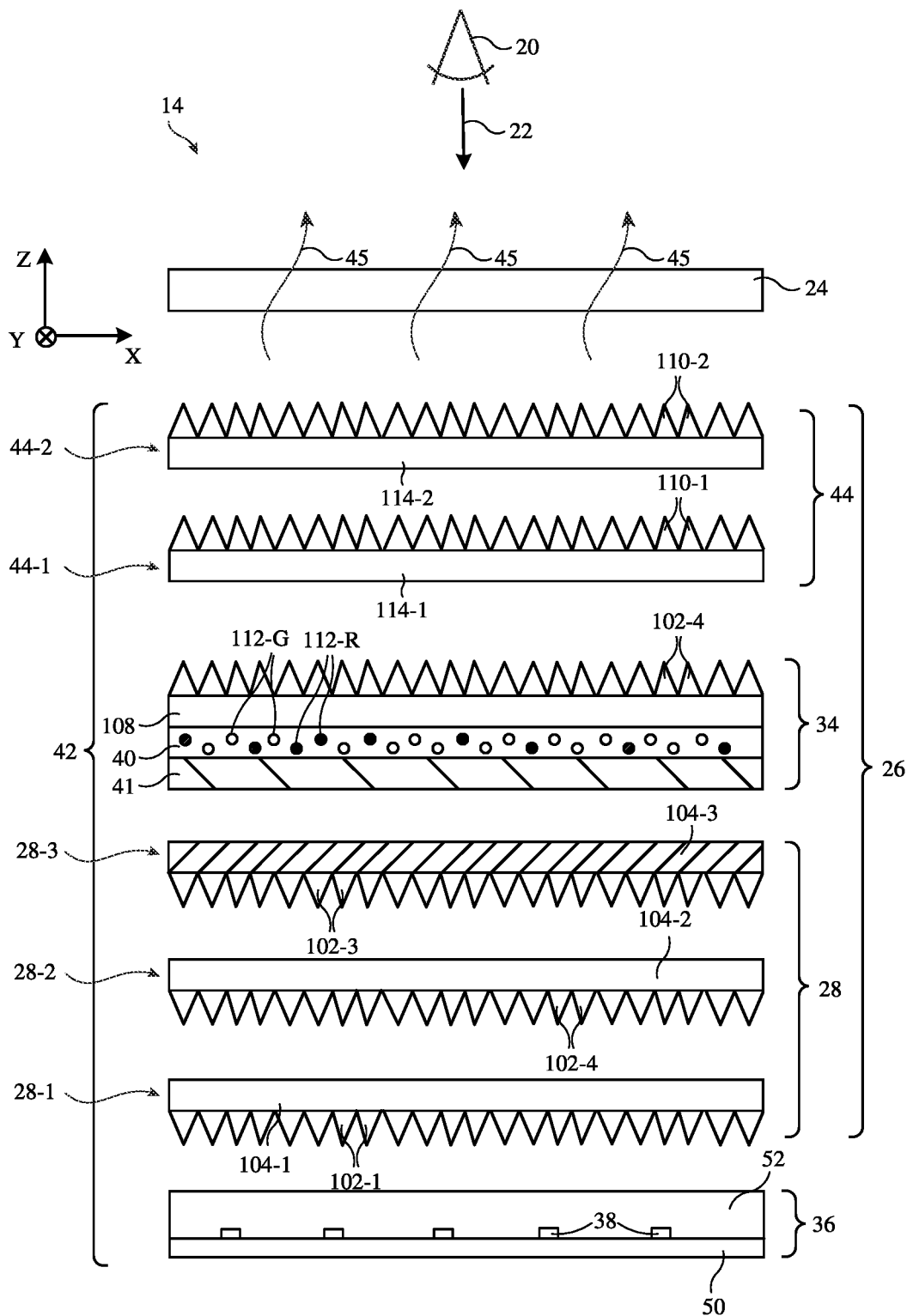
FIG. 4 is a cross-sectional side view of an illustrative display having a direct-lit backlight unit with three light spreading layers, a color conversion layer, and two brightness enhancement films in accordance with an embodiment.

As previously mentioned, more than one light spreading layer 28 and more than one brightness enhancement film may be included in the optical films 26 of the backlight unit 42. FIG. 4 is a cross-sectional side view of an illustrative display having three light spreading layers and two brightness enhancement films.

As shown in FIG. 4, a first light spreading layer 28-1, a second light spreading layer 28-2, and a third light spreading layer 28-3 are formed between light-emitting diode array 36 and color conversion layer 34. Each light spreading layer has a similar structure, with protrusions (sometimes referred to as prisms or light redirecting structures) extending from a substrate (base film). Light spreading layer 28-1 includes protrusions 102-1 that extend from substrate 104-1. Light spreading layer 28-2 includes protrusions 102-2 that extend from substrate 104-2. Light spreading layer 28-3 includes protrusions 102-3 that extend from substrate 104-3.

Substrates 104-1, 104-2, and 104-3 may sometimes be referred to as base film portions and may be formed from a transparent material such as polyethylene terephthalate (PET) or any other desired material. Light redirecting structures 102-1, 102-2, and 102-3 may be formed from the same material as base film portions 104-1, 104-2, and 104-3 or may be formed from a different material than the base film portion. Different materials may be used in each light spreading layer if desired or the light spreading layers may be formed from the same material(s).

For each light spreading layer, the protrusions 102 may be formed in an array across the light spreading layer. Each protrusion 102 (sometimes referred to as light redirecting structure 102 or prism 102) may split an incoming point light source into three or more points. The protrusions may have a pyramidal shape (e.g., with a square base and four triangular faces that meet at a vertex), a triangular pyramid shape (e.g., with a triangular base and three triangular faces that meet at a vertex), partial-cube shape (e.g., corner-cubes by three square faces that meet at a vertex), a tapered pyramid structure (where each face of the pyramid has an upper portion and a lower portion that are at an angle relative to one another), or any other desired shape. Square-based pyramidal protrusions may split a point light source into four points, whereas triangular pyramidal protrusions may split a point light source into three points.

Figure 5:
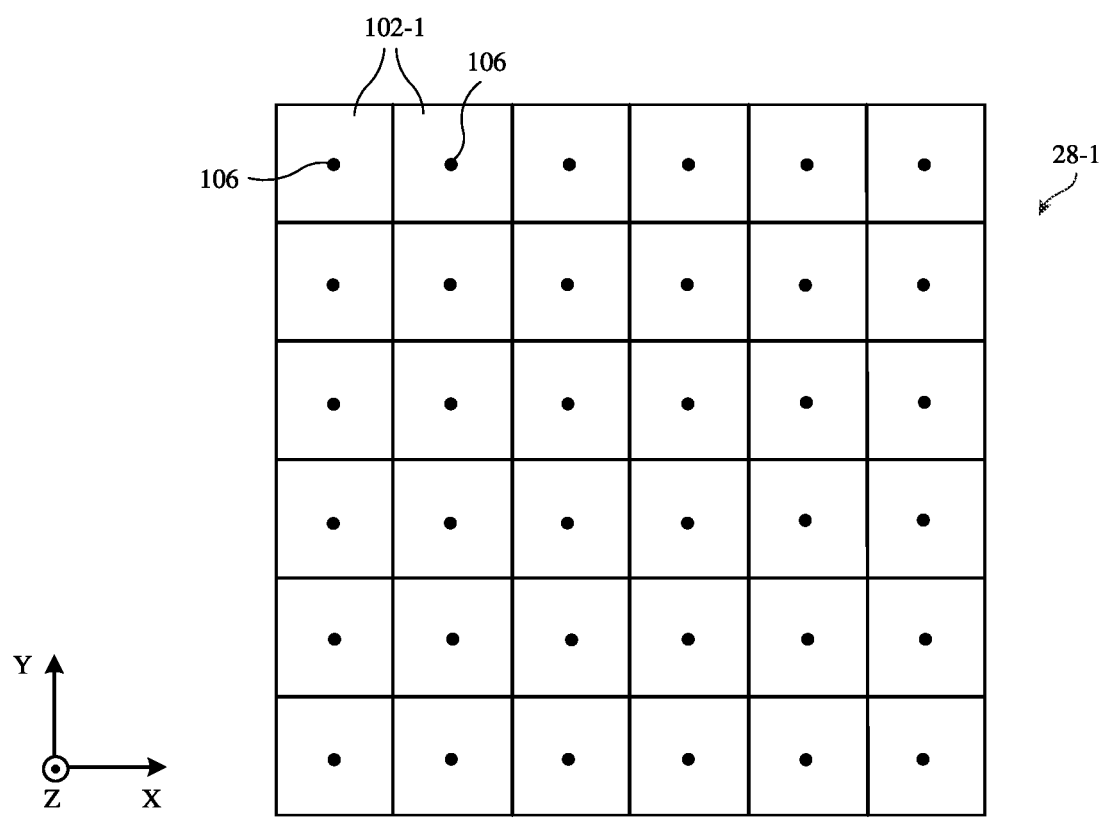
FIG. 5 is a top view of an illustrative light spreading layer showing the layout of pyramidal protrusions in the light spreading layer in accordance with an embodiment.

FIG. 5 is a top view of light spreading layer 28-1 showing how protrusions 102-1 may be arranged in an array. In this case, each protrusion has a pyramidal shape with a square base and four triangular faces that meet at a vertex 106.

The example in FIGS. 4 and 5 of the light redirecting structures 102 being formed from protrusions from a substrate is merely illustrative. In another possible arrangement, the light redirecting structures may be formed as recesses in the corresponding substrate film 104. The recesses may have any desired shape (e.g., a square-based pyramidal shape, a triangular-based pyramidal shape, etc.). Additionally, the example in FIG. 4 of light redirecting structures 102 being formed on the lower surface of the light redirecting layers is merely illustrative. Light redirecting structures 102 may alternatively be formed on the upper surface in one or more of the light redirecting layers.

Substrates 104-1, 104-2, and 104-3 in FIG. 4 may each have a matte upper surface (e.g., the surface that is higher in the positive Z-direction may be matte). The matte upper surface may mitigate undesired reflections in the backlight unit.

Light spreading layer 28-3 (e.g., substrate 104-3 and/or prisms 102-3) may be formed from a diffusive material such that light travelling along the Z-axis is diffused by light spreading layer 28-3. In contrast, light spreading layers 28-1 and 28-2 are not formed from diffusive material. In one arrangement, substrate 104-3 is formed from an entirely different (and more diffusive) material than substrate 104-2 and 104-1. In another possible arrangement, substrates 104-1, 104-2, and 104-3 are formed from the same base material and substrate 104-3 includes an additive that increases the diffusion of substrate 104-3 relative to substrates 104-1 and 104-2 (which do not include the diffusion-increasing additive).

As shown in FIG. 4, color conversion layer 34 may include a phosphor layer 40 (e.g., a layer of white phosphor material or other photoluminescent material) that converts blue light into white light. If desired, other photoluminescent materials may be used to convert blue light from LEDs 38 to light of different colors (e.g., red light, green light, white light, etc.). For example, phosphor layer 40 may include red quantum dots 112-R that convert blue light into red light and green quantum dots 112-G that convert blue light into green light (e.g., to produce white backlight illumination that includes, red, green, and blue components, etc.).

In addition to phosphor layer 40, color conversion layer 34 may include a partially reflective layer 41. Partially reflective layer 41 (sometimes referred to as a dichroic layer or dichroic filter layer) may reflect all red and green light and partially reflect blue light, for example. Partially reflective layer 41 therefore allows for some of the blue light to be recycled through optical films 26.

An additional film such as film 108 may also be included in the color conversion layer. The additional film 108 (sometimes referred to as an optical film, substrate, base film, etc.) may be formed from a polymer material (e.g., polyethylene terephthalate). Light redirecting structures such as protrusions 102-4 may be formed on an upper surface of additional film 108. Protrusions 102-4 may have any one of the arrangements described above in connection with protrusions 102-1, 102-2, and 102-3 (e.g., an array of pyramids as shown in FIG. 5). Light redirecting structures 102-4 may be formed from the same material as film 108 or may be formed from a different material than the film 108.

In the example of FIG. 4, a first brightness and enhancement film 44-1 and a second brightness enhancement film 44-2 are included in the backlight unit. Each brightness enhancement film has a similar structure, with protrusions (sometimes referred to as prisms or light redirecting structures) extending from a substrate (base film). Brightness enhancement film 44-1 includes protrusions 110-1 that extend from substrate 114-1. Brightness enhancement film 44-2 includes protrusions 110-2 that extend from substrate 114-2.

Substrates 114-1 and 114-2 may sometimes be referred to as base film portions and may be formed from a transparent material such as polyethylene terephthalate (PET) or any other desired material. Light redirecting structures 110-1 and 110-2 may be formed from the same material as base film portions 114-1 and 114-2 or may be formed from a different material than the base film portions. Different materials may be used in each brightness enhancement film if desired or the light spreading layers may be formed from the same material(s).

In each brightness enhancement film, the protrusions 110 may extend in strips across the light spreading layer. For example, protrusions 110-1 may be elongated, parallel protrusions (sometimes referred to as ridges) that extend along a longitudinal axis across the layer (e.g., parallel to the Y-axis in FIG. 4). Protrusions 110-2 may have a similar structure as protrusions 110-1 (with elongated, parallel protrusions extending across the brightness enhancement film). Protrusions 110-2 may be rotated (e.g., by 90°) relative to the protrusions 110-1.

The example in FIG. 4 of the light redirecting structures 110 being formed from protrusions from a substrate is merely illustrative. In another possible arrangement, the light redirecting structures 110 may be formed as recesses (e.g., elongated recesses) in the corresponding substrate film 114. Additionally, the example in FIG. 4 of light redirecting structures 110 being formed on the upper surface of the brightness enhancement films is merely illustrative. Light redirecting structures 110 may alternatively be formed on the lower surface in one or more of the brightness enhancement films.

In FIG. 4, each adjacent pair of optical films may be separated by an air gap. The air gap may provide a refractive index difference as light enters and exits each optical film, ensuring the light from LEDs 38 is spread by the light spreading layers 28 (e.g., via refraction and/or diffraction).

Figure 6:
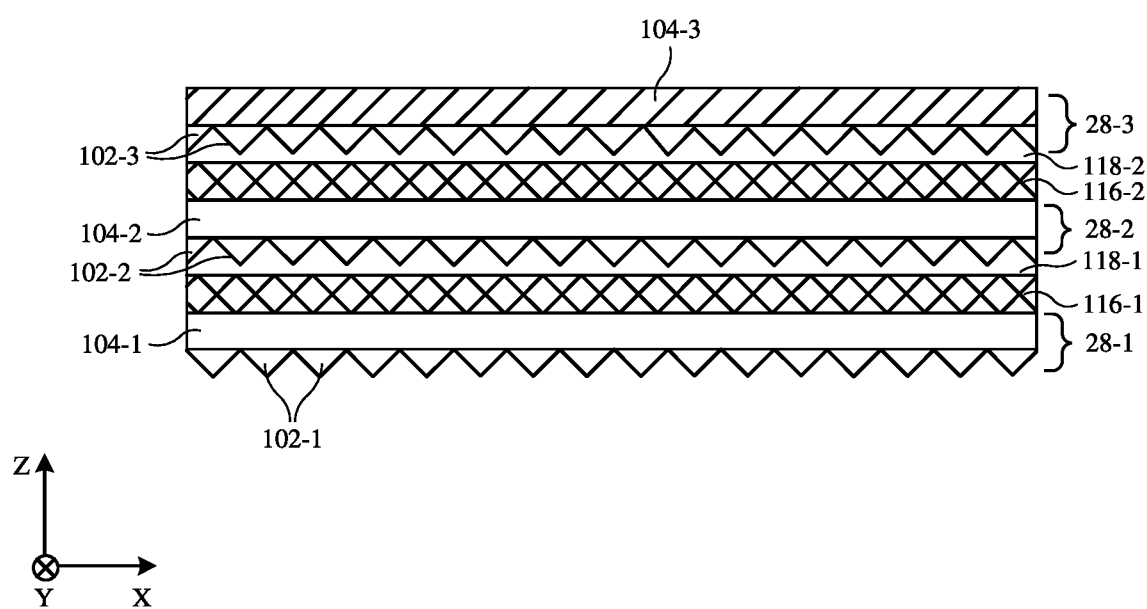
FIG. 6 is a cross-sectional side view of illustrative light spreading layers that may be included in a backlight unit without any air gaps in accordance with an embodiment.

Alternatively, instead of including air gaps between light spreading layers 28-1, 28-2, and 28-3, a low-index sheet may be incorporated between each adjacent light spreading layer. FIG. 6 is a cross-sectional side view of light spreading layers that may be included in the backlight unit (e.g., in the backlight unit of FIG. 4). Similar to as in FIG. 4, the light spreading layers in FIG. 6 include a first light spreading layer 28-1, a second light spreading layer 28-2, and a third light spreading layer 28-3. Each light spreading layer has a similar structure, with protrusions (sometimes referred to as prisms or light redirecting structures) extending from a substrate. Light spreading layer 28-1 includes protrusions 102-1 that extend from substrate 104-1. Light spreading layer 28-2 includes protrusions 102-2 that extend from substrate 104-2. Light spreading layer 28-3 includes protrusions 102-3 that extend from substrate 104-3.

However, instead of an air gap separating each light spreading layer (as in FIG. 4), the light spreading layers in FIG. 6 are separated by a low-index layer and a diffusive adhesive layer. As shown in FIG. 6, a diffusive adhesive layer 116-1 and low-index layer 118-1 are interposed between light spreading layers 28-1 and 28-2. In the arrangement of FIG. 6, adhesive layer 116-1 is interposed between (and directly contacts) base film portion 104-1 and low-index layer 118-1 whereas low-index layer 118-1 is interposed between (and directly contacts) adhesive layer 116-1 and protrusions 102-2. Low-index layer 118-1 may conform to and directly contact protrusions 102-2.

As shown in FIG. 6, a diffusive adhesive layer 116-2 and low-index layer 118-2 are interposed between light spreading layers 28-2 and 28-3. In the arrangement of FIG. 6, adhesive layer 116-2 is interposed between (and directly contacts) base film portion 104-2 and low-index layer 118-2 whereas low-index layer 118-2 is interposed between (and directly contacts) adhesive layer 116-2 and protrusions 102-3. Low-index layer 118-2 may conform to and directly contact protrusions 102-3.

The low-index layers 116-1 and 116-2 may be formed from a transparent material having an index of refraction that is less than 1.4, less than 1.3, less than 1.2, less than 1.1, between 1.1 and 1.3, or any other desired index of refraction. Protrusions 102-2 and 102-3 (as well as corresponding base film portions 104-2 and 104-3) may have refractive indices that are greater than 1.4, greater than 1.5, greater than 1.6, greater than 1.7, between 1.6 and 1.7, or any other desired index of refraction. The difference in refractive index between low-index layer 118-1 and protrusions 102-2 may be greater than 0.2, greater than 0.3, greater than 0.4, greater than 0.5, greater than 0.6, between 0.3 and 0.6, between 0.4 and 0.5, or any other desired refractive index difference. This refractive index difference ensures that protrusions 102-2 spread light received from the LEDs 38. The difference in refractive index between low-index layer 118-2 and protrusions 102-3 may be greater than 0.2, greater than 0.3, greater than 0.4, greater than 0.5, greater than 0.6, between 0.3 and 0.6, between 0.4 and 0.5, or any other desired refractive index difference. This refractive index difference ensures that protrusions 102-3 spread light received from the LEDs 38.

The adhesive layers 116-1 and 116-2 may be formed from a transparent material (e.g., having a transparency of greater than 95%, greater than 99%, etc.). The adhesive layers may optionally be diffusive. The adhesive layers may be formed from a diffusive material and/or may include an additive that increases the diffusion of the adhesive layer. The adhesive layers 116-1 and 116-2 may be pressure sensitive adhesive (PSA) or liquid optically clear adhesive (LOCA), as examples.

Having the light spreading layers integrated as in FIG. 6 may improve the buckling and wrinkle resistance of the light spreading layers while still maintaining satisfactory light spreading performance (due to the presence of the low-index layers).

In one possible arrangement, light spreading layers 28-1, 28-2, and 28-3 may have light spreading layers with the same orientation. FIGS. 7A-7C are top views of light spreading layers 28-1, 28-2, and 28-3 that may be included in backlight unit 42 in FIG. 4. As shown in FIG. 7A, light spreading layer 28-1 has protrusions 102-1 (e.g., pyramidal protrusions) that have bases with edges that are parallel to the X-axis and the Y-axis. Light spreading layer 28-2 in FIG. 7B has protrusions 102-2 with the same alignment/orientation as light spreading layer 28-1. Protrusions 102-2 may be pyramidal protrusions with edges (e.g., at their bases) that are parallel to the X-axis and Y-axis. Light spreading layer 28-3 in FIG. 7C has protrusions 102-3 with the same alignment/orientation as light spreading layer 28-1 and light spreading layer 28-2. Protrusions 102-3 may be pyramidal protrusions with edges (e.g., at their bases) that are parallel to the X-axis and Y-axis.

Instead of protrusions 102-1, 102-2, and 102-3 having the same alignment (as in FIGS. 7A-7C), the light spreading layers may instead have protrusions with different alignments. FIGS. 8A-8C show an arrangement of this type. FIGS. 8A-8C are top views of light spreading layers 28-1, 28-2, and 28-3 that may be included in backlight unit 42 in FIG. 4. As shown in FIG. 8A, light spreading layer 28-1 has protrusions 102-1 (e.g., pyramidal protrusions) that have bases with edges that are parallel to the X-axis and the Y-axis. However, light spreading layer 28-2 in FIG. 8B has protrusions 102-2 with a different alignment as light spreading layer 28-1. Protrusions 102-2 may be pyramidal protrusions with edges (e.g., at their bases) that are rotated by angle 120 relative to the edges of protrusions 102-1 (which are parallel to the X-axis and Y-axis). Angle 120 may be, for example, 30 degrees, between 20 degrees and 40 degrees, less than 45 degrees, greater than 10 degrees, between 25 and 35 degrees, or any other desired angle.

Light spreading layer 28-3 in FIG. 8C has protrusions 102-3 with a different alignment as light spreading layers 28-1 and 28-2. Protrusions 102-3 may be pyramidal protrusions with edges (e.g., at their bases) that are rotated by angle 122 relative to the edges of protrusions 102-1 (which are parallel to the X-axis and Y-axis). Angle 122 may be, for example, 60 degrees, between 50 degrees and 70 degrees, greater than 45 degrees, less than 80 degrees, between 55 and 65 degrees, or any other desired angle. The difference between angle 120 and angle 122 (which is also equal to the angle between the edges of protrusions 102-2 and protrusions 102-3) may be 30 degrees, between 20 degrees and 40 degrees, less than 45 degrees, greater than 10 degrees, between 25 and 35 degrees, or any other desired angle.

Rotating the protrusions of each light spreading layer relative to the protrusions of the other light spreading layers may improve the light mixing provided by light spreading layers 28-1, 28-2, and 28-3.

Figure 9C:
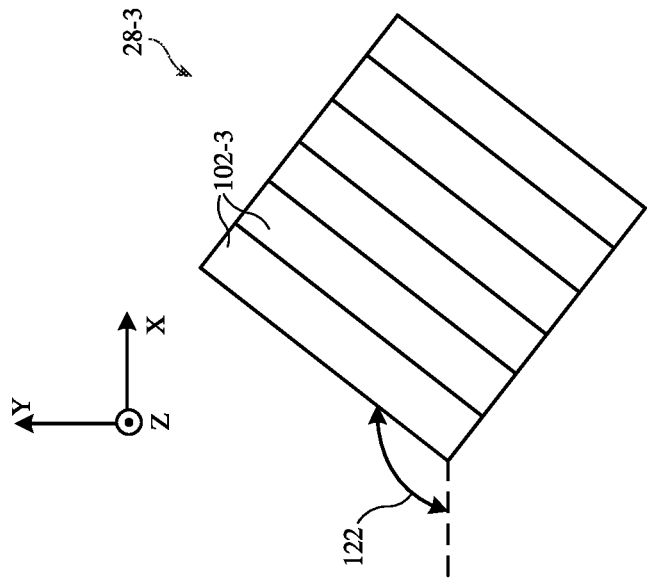
FIGS. 9A-9C are top views of illustrative light spreading layers showing how elongated protrusions in each light spreading layer may be rotated relative to the other light spreading layers in accordance with an embodiment.
Figure 9B:
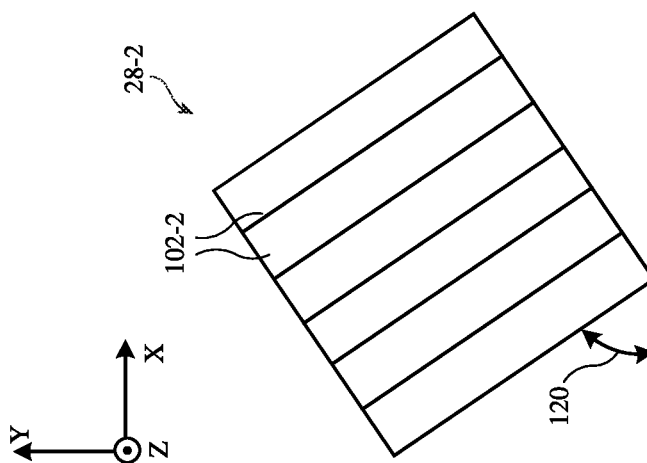
Figure 9A:
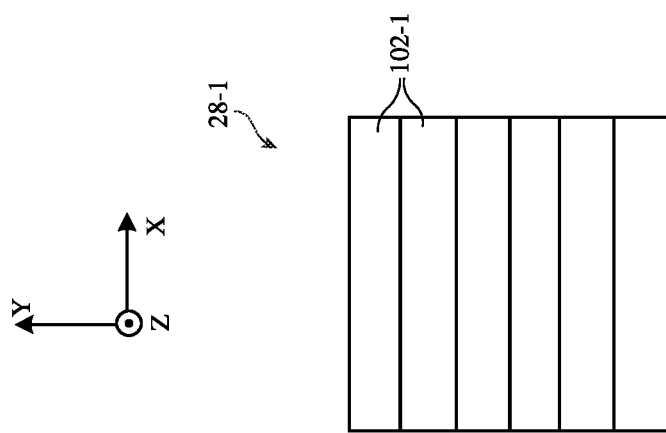

In some cases, light spreading layers 28-1, 28-2, and 28-3 may include elongated protrusions that extend along an axis across the light spreading layer. Each elongated protrusion may have the same cross-sectional shape (e.g., a triangular cross-section, a semi-circular cross-section, or any other desired shape) across its length. These protrusions may only spread light across one dimension. FIGS. 9A-9C are top views of light spreading layers 28-1, 28-2, and 28-3 that may be included in backlight unit 42 in FIG. 4. For example, in FIG. 9A, elongated protrusions 102-1 extend parallel to the X-axis. These protrusions therefore spread light along the Y-direction (e.g., in the positive and negative Y-direction). In contrast, the pyramidal protrusions (e.g., in FIG. 7A), spread light along two directions (e.g., both in the positive and negative X-direction and in the positive and negative Y-direction).

When light spreading layers 28-1, 28-2, and 28-3 include elongated protrusions, the alignment of the protrusions in each light spreading layer may be rotated relative to the other light spreading layers. As shown in FIG. 9A, light spreading layer 28-1 has protrusions 102-1 (e.g., elongated protrusions) that have bases with edges that are parallel to the Y-axis. However, light spreading layer 28-2 in FIG. 9B has protrusions 102-2 with a different alignment/orientation as light spreading layer 28-1. Protrusions 102-2 may be elongated protrusions with edges (e.g., at their bases) that are rotated by angle 120 relative to the edges of protrusions 102-1 (which are parallel to the Y-axis). Angle 120 may be, for example, 60 degrees, between 50 degrees and 70 degrees, greater than 45 degrees, less than 80 degrees, between 55 and 65 degrees, or any other desired angle.

Light spreading layer 28-3 in FIG. 9C has protrusions 102-3 with a different alignment/orientation as light spreading layers 28-1 and 28-2. Protrusions 102-3 may be elongated protrusions with edges (e.g., at their bases) that are rotated by angle 122 relative to the edges of protrusions 102-1 (which are parallel to the Y-axis). Angle 122 may be, for example, 120 degrees, between 110 degrees and 130 degrees, greater than 90 degrees, less than 180 degrees, between 100 and 140 degrees, or any other desired angle. The difference between angle 120 and angle 122 (which is also equal to the angle between the edges of protrusions 102-2 and protrusions 102-3) may be 60 degrees, between 50 degrees and 70 degrees, greater than 45 degrees, less than 80 degrees, between 55 and 65 degrees, or any other desired angle.

Rotating the elongated protrusions of each light spreading layer relative to the elongated protrusions of the other light spreading layers may improve the light mixing provided by light spreading layers 28-1, 28-2, and 28-3.

As previously discussed, the angle between the protrusions of each film in FIGS. 8A-8C may be 30 degrees. This value may be obtained by dividing 90 degrees by the number of light spreading layers. In other words, the angle between each adjacent pair of light spreading layers in FIGS. 8A-8C may be equal to 90 degrees divided by the total number of light spreading layers. This example is merely illustrative. In another possible arrangement, the angle between each adjacent pair of light spreading layers may be equal to 180 degrees divided by the total number of light spreading layers. For example, the angle between the protrusions of each film in FIGS. 9A-9C may be 60 degrees. This value may be obtained by dividing 180 degrees by the number of light spreading layers. In other words, the angle between each adjacent pair of light spreading layers in FIGS. 9A-9C may be equal to 180 degrees divided by the total number of light spreading layers.

Figure 10:
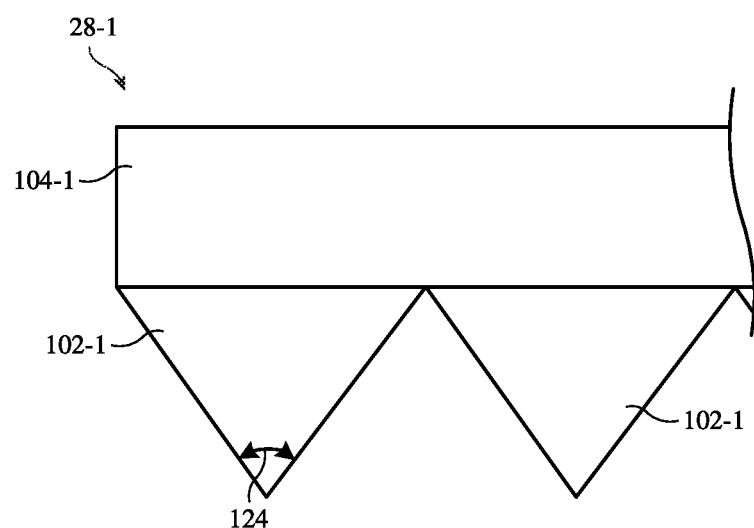
FIG. 10 is a cross-sectional side view of an illustrative light spreading layer showing how the apex angle of the protrusions in the light spreading layer may be non-orthogonal in accordance with an embodiment.

FIG. 10 is a cross-sectional side view of an illustrative light spreading layer in backlight unit 42. As shown, whether the protrusions 102-1 are formed from a pyramidal structure (as in FIGS. 7A-7C and FIGS. 8A-8C) or an elongated structure (e.g., having a triangular cross-sectional shape), the protrusions 102-1 are defined by an apex angle 124. Apex angle may be equal to 90 degrees or may be equal to a non-orthogonal angle. Apex angle 124 may be between 75 degrees and 105 degrees, between 80 degrees and 89 degrees, between 83 degrees and 87 degrees, a non-orthogonal angle between 75 degrees and 105 degrees, or any other desired angle.

Figure 11:
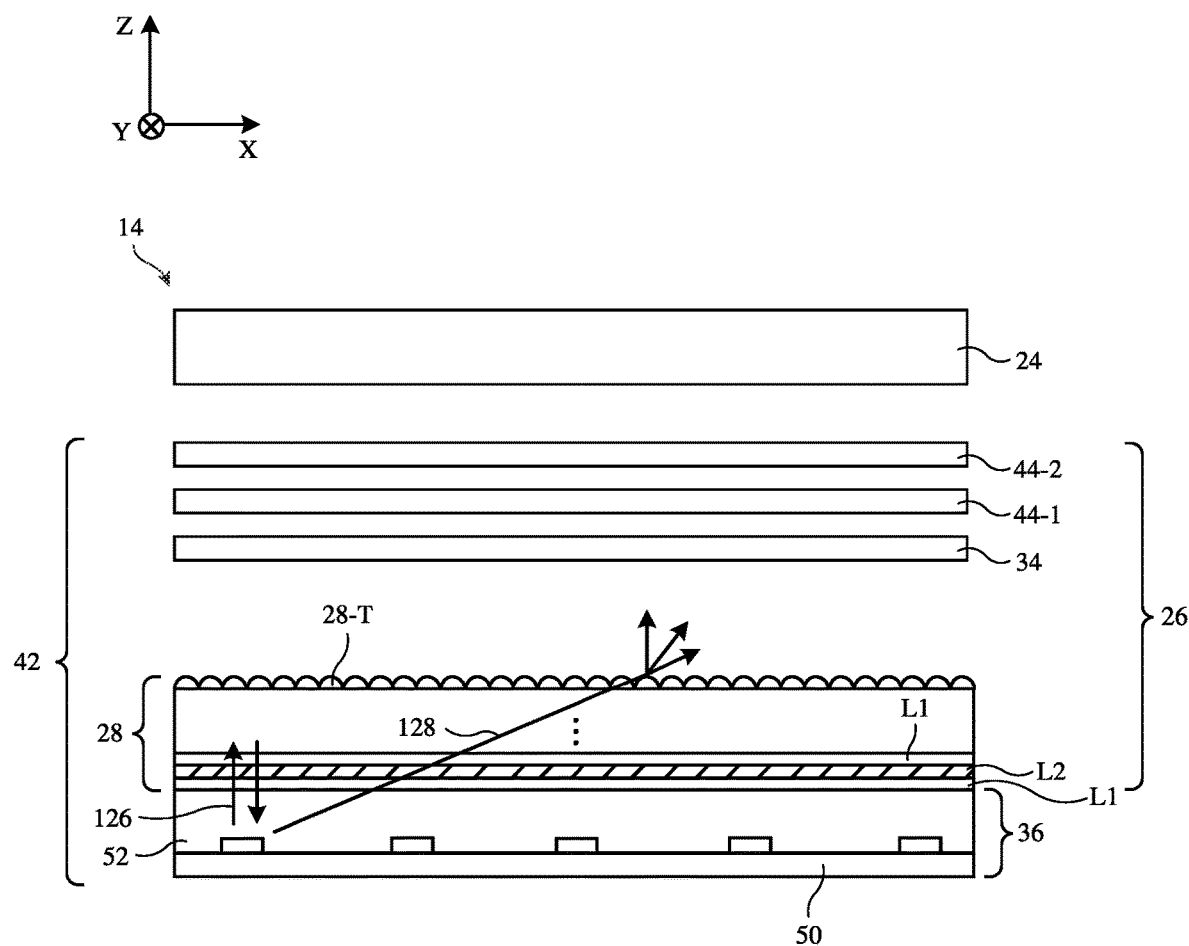
FIG. 11 is a cross-sectional side view of an illustrative display having a backlight with a light spreading layer that is attached directly to encapsulant of the LED array in accordance with an embodiment.

FIG. 11 is a cross-sectional side view of an illustrative display having a backlight with a light spreading layer 28 that is attached directly to encapsulant of the LED array for the backlight. As shown in FIG. 11, light spreading layer 28 is formed on an upper surface of encapsulant 52 for LED array 36. The light spreading layer 28 may be in direct contact with the upper surface of encapsulant 52 or an optically clear adhesive layer may attach the light spreading layer directly to the upper surface of encapsulant (e.g., the adhesive layer may have a first surface in direct contact with the light spreading layer 28 and a second surface in direct contact with the encapsulant 52).

In FIG. 11, light spreading layer 28 may have a low transmission (and high reflectivity) for on-axis light (e.g., light that is parallel to the Z-axis) and an increasingly high transmission with increasingly high-angled off-axis light (e.g., light that is angled away from the Z-axis). Consequently, on-axis light rays such as on-axis light 126 (that are emitted parallel to the surface normal of the display and therefore considered 'on-axis') that are emitted in the positive Z-direction are reflected in the negative Z-direction by light spreading layer 28. Meanwhile, off-axis light rays (that deviate from the surface normal of the display by a large angle) such as off-axis light 128 may be transmitted by light spreading layer 28. Light spreading layer 28 may mitigate hotspots caused by LEDs 38 by reflecting on-axis light from LEDs 38 while transmitting off-axis light from LEDs 38.

The varying transmission profile as a function of entry angle may be achieved using a plurality of layers with different refractive indices. For example, layers L1 and L2 may alternate throughout the light spreading layer 28. There may be any desired number of layers of each type in the light spreading layer (e.g., more than two, more than five, more than ten, more than thirty, more than fifty, more than one hundred, more than two hundred, less than two hundred, between fifty and one hundred and fifty, etc.). Layers L1 and L2 may be formed from polymer materials that have a refractive index difference. For example, layer L1 may have a refractive index of less than 1.55 whereas layer L2 may have a refractive index of more than 1.65. The difference in refractive index between layers L1 and L2 may be more than 0.1, more than 0.15, more than 0.2, more than 0.25, between 0.15 and 0.25, between 0.1 and 0.3, or any other desired magnitude.

Figure 12:
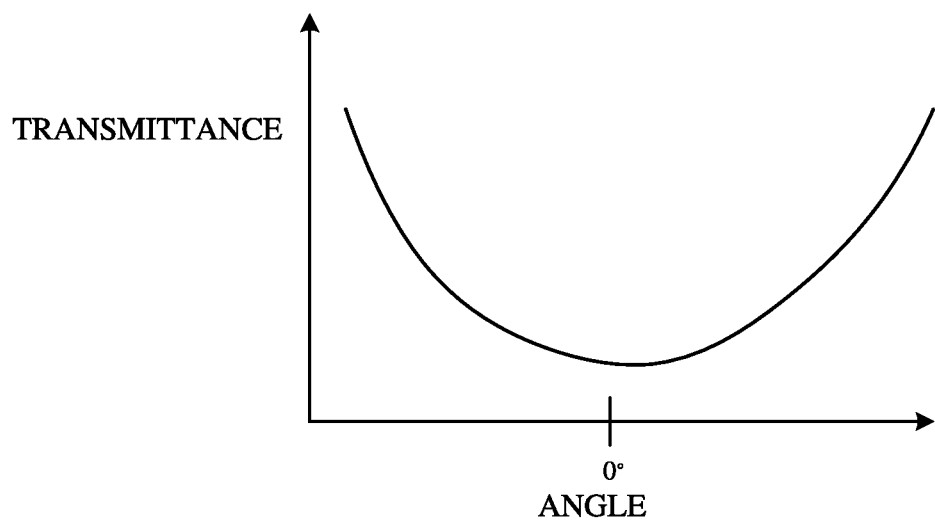
FIG. 12 is a graph of transmittance as a function of incidence angle for the light spreading layer in FIG. 11 in accordance with an embodiment.

FIG. 12 is a graph showing the transmission profile of light spreading layer 28 as a function of the incidence angle of light received by the light spreading layer. As shown, transmittance may be at a minimum at an on-axis (0 degree) angle (e.g., ray 126 in FIG. 11). At on-axis entry angles, transmittance may be less than 10%, less than 5%, less than 3%, less than 2%, etc. At on-axis entry angles, the light spreading layer may reflect more than 90% of light, more than 95% of light, more than 97% of light, more than 98% of light, etc. As the incidence angle of light increases in either off-axis direction (e.g., positive off-axis directions or negative off-axis directions), transmittance through the light spreading layer increases (and, accordingly, reflectance decreases). In other words, transmittance through the light spreading layer increasing with increasing deviation of the angle of incidence from the surface normal. The shape of the profile shown in FIG. 12 is merely illustrative. In general, the profile may have any desired shape.

Light spreading layer 28 in FIG. 11 may be formed with a diffuse top surface 28-T that includes texture/roughness to help mitigate total internal reflection off of the upper surface and spread the light that exits the light spreading layer across a wider range of viewing angles.

The layers above light spreading layer 28 in FIG. 11 may be the same as in FIG. 4 (e.g., with a color conversion layer 34, brightness enhancement films 44-1 and 44-2, and pixel array 24).

Figure 13:
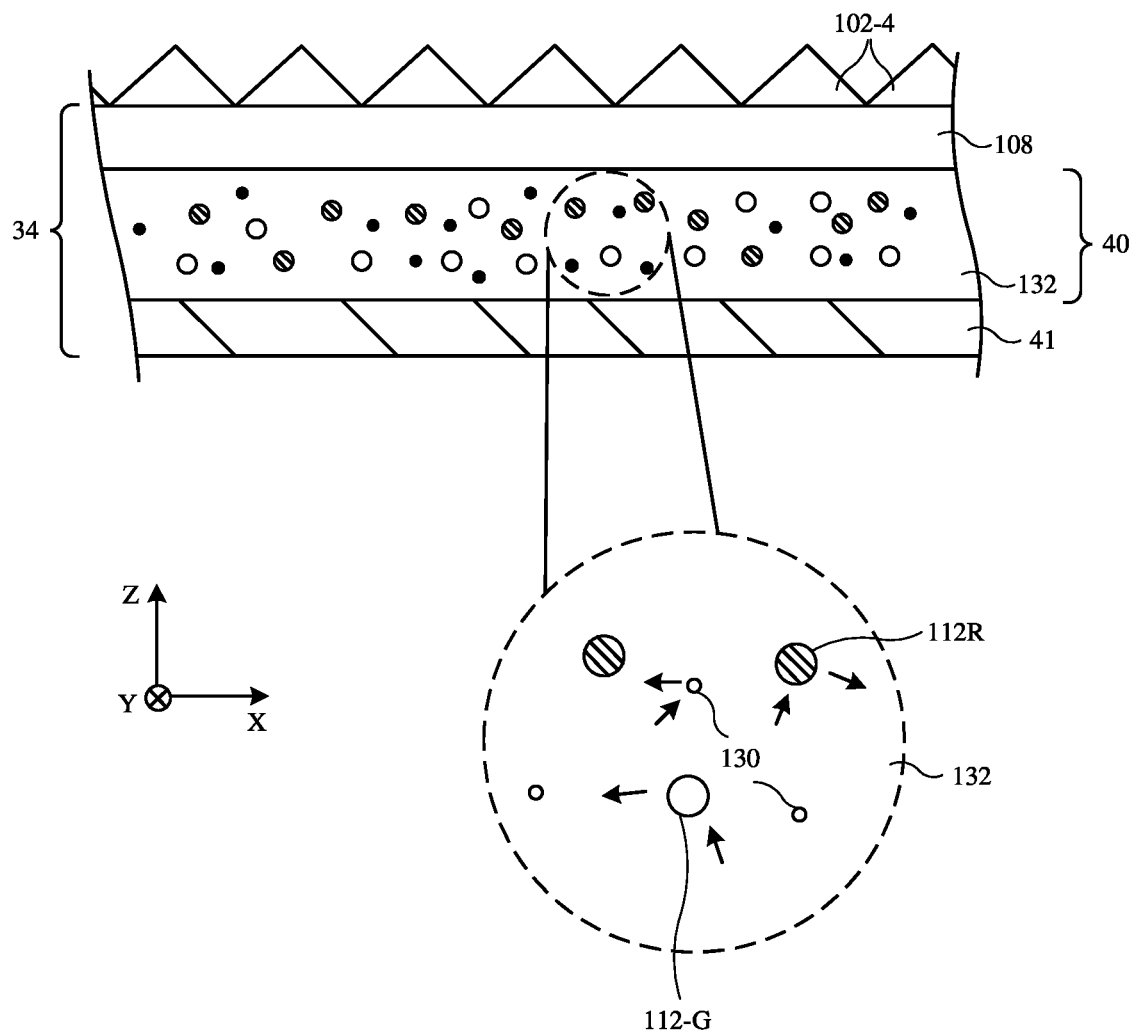
FIG. 13 is a cross-sectional side view of an illustrative color conversion layer that includes scattering dopants in addition to color conversion material (e.g., red and green phosphor, quantum dots, perovskite, etc.) in accordance with an embodiment.

FIG. 13 is a cross-sectional side view of an illustrative color conversion layer 34 with scattering dopants for increasing the amount of off-axis blue light. The color conversion layer 34 in FIG. 13 may be used in any of the backlight arrangements herein (e.g., in the backlight of FIG. 4, the backlight of FIG. 11, etc.). As shown in the inset portion of FIG. 13, red quantum dots 112-R output light in a random direction (e.g., the direction that red light is output is not correlated to the direction that blue light is received). Similarly, green quantum dots 112-G output light in a random direction (e.g., the direction that green light is output is not correlated to the direction that blue light is received). To make the emission direction of blue light more random (and therefore equalize the off-axis emission of blue light to the off-axis emission of red and green light), scattering dopants 130 may be included in the phosphor layer. Scattering dopants 130 may elastically scatter blue light. This means that no energy is lost when the scattering dopants 130 receive blue light and that the wavelength of the light is not changed by the scattering dopants. However, the scattering dopants randomize the direction of the blue light. The blue light will be scattered by the scattering dopants while the red and green light will tend not to be scattered by the scattering dopants. Consequently, the distribution of red, blue, and green light may be equalized both on-axis and off-axis.

The average diameter of the scattering dopants may be between 5 and 20 nanometers, less than 500 nanometers, less than 100 nanometers, less than 50 nanometers, less than 20 nanometers, more than 5 nanometers, more than 1 nanometer, or any other desired diameter. The average diameter of quantum dots 112-R and 112-G may be more than 500 nanometers, more than 1 micron, more than 2 microns, between 1 and 3 microns, less than 5 microns, or any other desired diameter.

The quantum dots 112-R and 112-G as well as scattering dopants 130 may be distributed in a resin 132 (sometimes referred to as host resin 132). Resin 132 may have an index of refraction of less than 1.5, less between 1.45 and 1.55, less than 1.6, less than 1.55, greater than 1.4, between 1.4 and 1.6, or any other desired index of refraction. To achieve the desired scattering using the scattering dopants, the scattering dopants may be formed using a transparent material that has an index of refraction that is greater than 1.5, greater than 1.55, greater than 1.6, greater than 1.65, greater than 1.7, between 1.6 and 1.7, between 1.55 and 1.7, or any other desired index of refraction. The difference in refractive index between resin 132 and scattering dopants 130 may be greater than 0.05, greater than 0.1, greater than 0.15, greater than 0.2, between 0.1 and 0.2, between 0.15 and 0.2, or any other desired magnitude.

In general, the scattering dopants may be formed from any desired material (e.g., silicone, melamine, etc.). As one example, the scattering dopants may be formed from melamine ($C_3H_6N_6$), having an index of refraction of 1.66) whereas the resin 132 may have a refractive index of 1.49. The density of scattering dopants 130 within the phosphor layer may be less than 10 $g/m^3$, less than 5 $g/m^3$, less than 3 $g/m^3$, less than 2 $g/m^3$, more than 1 $g/m^3$, more than 2 $g/m^3$, more than 3 $g/m^3$, between 1 $g/m^3$ and 3 $g/m^3$, between 1.5 $g/m^3$ and 2.5 $g/m^3$, between 1 $g/m^3$ and 5 $g/m^3$, or any other desired density.

It should be noted that the example of including red and green quantum dots in the color conversion layer is merely illustrative. In general, any desired red/green color conversion materials may be included (e.g., red and green phosphor, quantum dots, perovskite, etc.).

Figure 14:
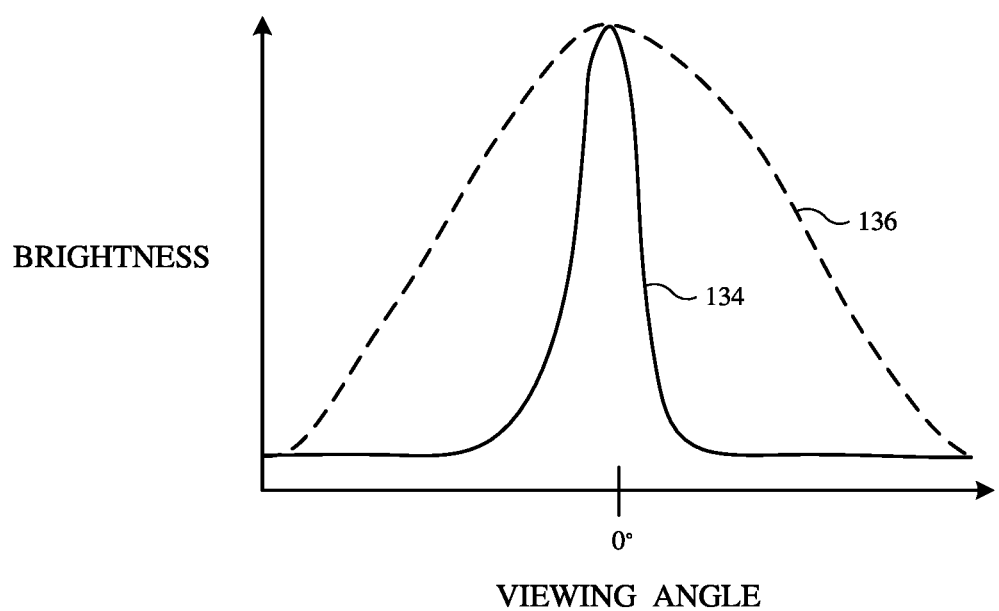
FIG. 14 is a graph of brightness as a function of viewing angle for a color conversion layer in accordance with an embodiment.

FIG. 14 is graph of the blue light brightness of the phosphor layer 40 as a function of viewing angle. Both profiles 134 and 136 reflect the scattering profile of blue light (e.g., at 450 nanometers or another desired wavelength) exiting the phosphor layer when the phosphor layer receives collimated blue light.

Profile 134 shows the brightness curve for a phosphor layer 40 that does not include scattering dopants. As shown, the brightness peaks around 0 degrees with a drop off to low brightness levels at off-axis viewing angles. Profile 136 shows the brightness curve for a phosphor layer 40 that does include scattering dopants (e.g., the phosphor layer of FIG. 13). As shown, the presence of the scattering dopants increases the breadth of the profile, such that the brightness is higher at off-axis viewing angles relative to profile 134. With the scattering dopants (e.g., profile 136), the blue light has a sufficiently high brightness at off-axis viewing angles to match the brightness curves of green light and red light that are also emitted from the phosphor layer. When scattering dopants 130 are included in the phosphor layer, the light is therefore uniform across a wide range of viewing angles (since the red, blue, and green brightness have similar profiles). Without scattering dopants 130, the light may not be uniform at off-axis viewing angles (due to a relatively low amount of blue light being present compared to red light and green light).

In FIG. 14, profile 136 (for a color conversion layer with scattering dopants) may have a first width at 75% of the peak brightness (which is at an on-axis, 0 degree angle), a second width at 50% of the peak brightness, and a third width at 25% of the peak brightness. The first width may be greater than 20 degrees, greater than 25 degrees, greater than 30 degrees, less than 35 degrees, between 20 degrees and 30 degrees, between 25 degrees and 30 degrees, etc. The second width may be greater than 40 degrees, greater than 45 degrees, greater than 50 degrees, less than 60 degrees, between 40 degrees and 60 degrees, between 45 degrees and 55 degrees, etc. The third width may be greater than 60 degrees, greater than 70 degrees, greater than 80 degrees, less than 100 degrees, less than 90 degrees, between 60 degrees and 100 degrees, between 75 degrees and 85 degrees, etc. As one illustrative example, the first width may be between 25 degrees and 30 degrees, the second width may be between 45 degrees and 55 degrees, and the third width may be between 75 degrees and 85 degrees. The shapes of profiles 134 and 136 shown in FIG. 14 are merely illustrative. In general, the profiles may have any desired shapes.

Figure 15:
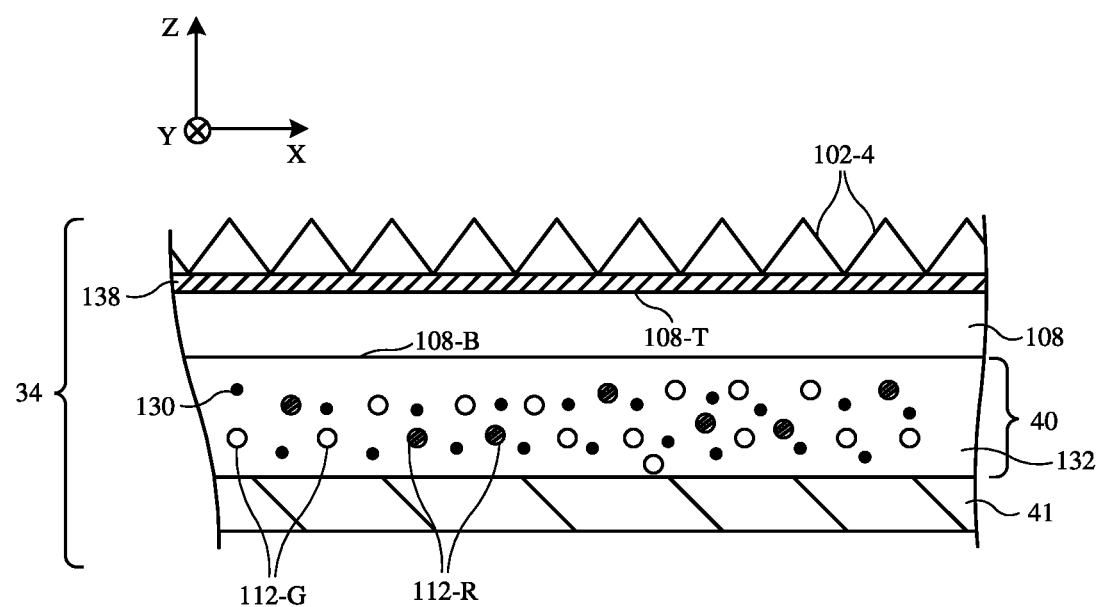
FIG. 15 is a cross-sectional side view of an illustrative color conversion layer that includes an anti-static layer in accordance with an embodiment.

To mitigate electric static charge within color conversion layer 34, the color conversion layer 34 may include an embedded anti-static layer. FIG. 15 is a cross-sectional side view of an illustrative color conversion layer 34 that includes an anti-static layer. The color conversion layer 34 in FIG. 15 may be used in any of the backlight arrangements herein (e.g., in the backlight of FIG. 4, the backlight of FIG. 11, etc.). As shown in FIG. 15, anti-static layer 138 may be interposed between film 108 and protrusions 102-4. Without anti-static layer 138, the optical film formed by base film 108 and protrusions 102-4 may generate strong electric charge during the manufacturing process. Resin 132 in phosphor layer 40 may be repelled by the electric static charge on the bottom surface 108-B of film 108. This may cause coating uniformity issues (e.g., visible dimple defects) when film 108 is laminated to phosphor layer 40.

Anti-static layer 138 is formed on the top surface 108-T of the base film 108. The anti-static layer 138 may be formed from any desired anti-static material having a high transparency (e.g., greater than 90%, greater than 95%, greater than 99%, etc.). Without anti-static layer 138, the static decay time at bottom surface 108-B of film 108 may be undesirably high (e.g., greater than 1 minute). With anti-static layer 138 present, the static decay time at bottom surface 108-B of film 108 may be less than 10 seconds, less than 5 seconds, less than 2 seconds, less than 1 second, less than 0.5 seconds, less than 0.3 seconds, less than 0.2 seconds, between 0.1 and 1 seconds, etc.

The anti-static layer 138 may be interposed between film 108 and any desired type of protrusions 102-4 (e.g., pyramidal protrusions, elongated protrusions, etc.). In another possible arrangement, protrusions 102-4 may be omitted from the color conversion layer and anti-static layer 138 may be the upper-most layer in the color conversion layer. The anti-static layer may also be formed at other desired positions within the backlight if desired.

To mitigate color breakup caused by a brightness difference between blue light and red/green light, color conversion layer 134 may include a low-index layer between the phosphor layer 40 and film 108. Without the low-index layer (e.g., in an embodiment of the type shown in FIGS. 13 and 15), the combination of base film portion 108, phosphor layer 40, and partially reflective layer 41 may (for some of the light) effectively form a waveguide that guides light via total internal reflection. This phenomenon may impact the red and green light more than the blue light, leading to color breakup.

Figure 16:
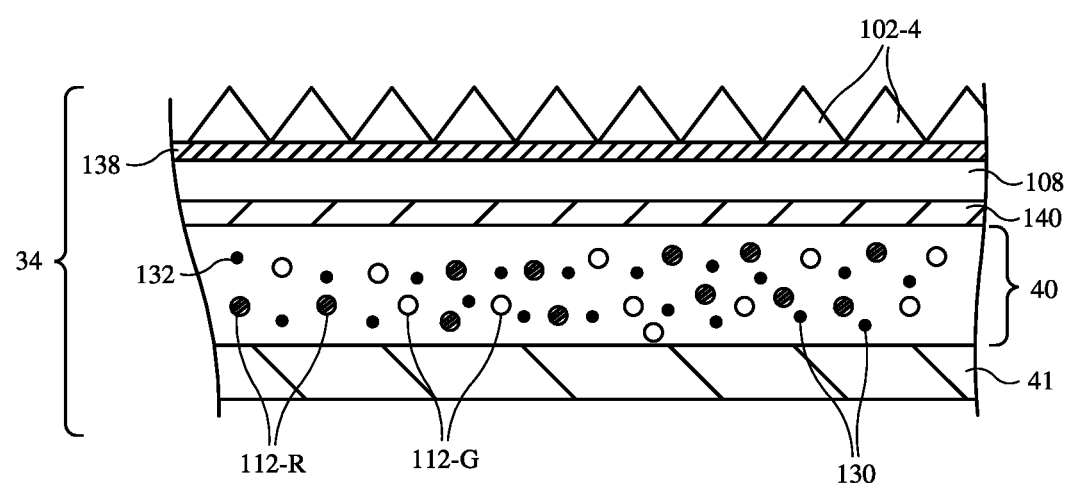
FIG. 16 is a cross-sectional side view of an illustrative color conversion layer that includes a low-index layer in accordance with an embodiment.

FIG. 16 is a cross-sectional side view of an illustrative color conversion layer 34 that includes a low-index layer to mitigate color breakup. The color conversion layer 34 in FIG. 16 may be used in any of the backlight arrangements herein (e.g., in the backlight of FIG. 4, the backlight of FIG. 11, etc.). As shown in FIG. 16, low-index layer 140 (sometimes referred to as optical decoupling layer) may be interposed between phosphor layer 40 and base film portion 108. Low-index layer 140 may be formed from a transparent material having an index of refraction that is less than 1.4, less than 1.3, less than 1.2, less than 1.1, between 1.0 and 1.3, or any other desired index of refraction. The difference in refractive index between low-index layer 140 and base film 108 may be greater than 0.2, greater than 0.3, greater than 0.4, greater than 0.5, greater than 0.6, between 0.3 and 0.6, between 0.4 and 0.5, or any other desired refractive index difference. The difference in refractive index between low-index layer 140 and resin 132 of phosphor layer 40 may be greater than 0.2, greater than 0.3, greater than 0.4, greater than 0.5, greater than 0.6, between 0.3 and 0.6, between 0.4 and 0.5, or any other desired refractive index difference.

Low-index layer 140 therefore effectively optically decouples base film portion 108 and phosphor layer 40. This breaks the aforementioned waveguide effect and mitigates color breakup in the color conversion layer 34. Additionally, the presence of the additional low-index layer may create additional light recycling, thus improving the point source function (PSF) width of light exiting the color conversion layer.

In addition to or instead of having low-index layer 140 between phosphor layer 40 and base film portion 108, a low-index layer may be incorporated at other locations within the color conversion layer (e.g., between base film portion 108 and protrusions 102-4).

Figure 17:
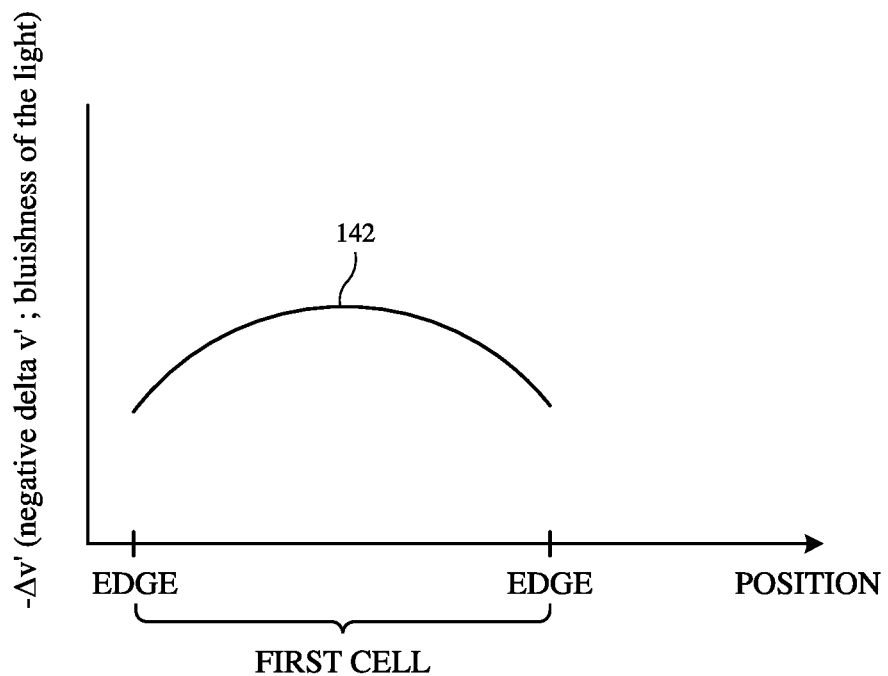
FIG. 17 is a graph illustrating the color variation from a light-emitting diode cell in $-\Delta v'$ (negative delta v') quantifying the bluishness of the light across the width of the light-emitting diode cell in accordance with an embodiment.

Returning to FIG. 3 which shows LED cells 38C, the light from the edge of a cell 38C tends to have been recycled more than light emitted from the center of the cell. Therefore, light from the edge of the cell may be less blue than light from the middle of the cell. FIG. 17 is a graph illustrating this effect. As shown by curve 142 in FIG. 17, light from the center of cell is bluer than light from the edges of the cell. The shape of the profile shown in FIG. 17 is merely illustrative. In general, the profile may have any desired shape.

Figure 18:
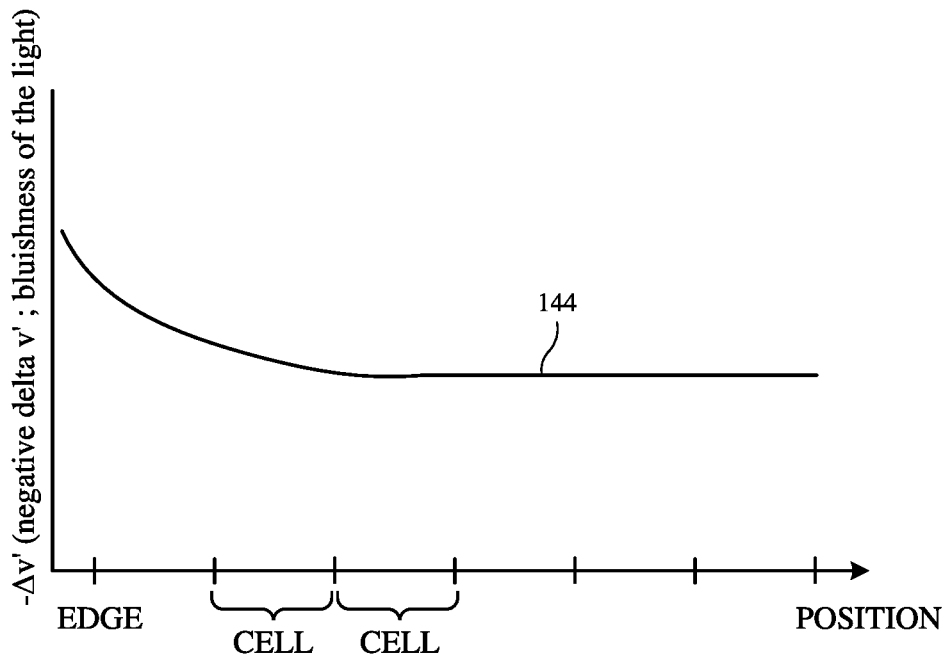
FIG. 18 is a graph illustrating how $-\Delta v'$ (negative delta v'), quantifying the bluishness of the light from a display, may vary across the width of the display in accordance with an embodiment.

Within the display (e.g., the middle of the display), light from a given cell is mixed with light from neighboring cells to produce display light of a uniform color (with a particular amount of blue light). However, at the edges of the display, there may be a shortage of yellow light (because at an edge, yellow light from a neighboring cell is absent at the border). This makes light from the edge of the display bluer than light from the middle of the display. This effect is shown in the graph of FIG. 18. As shown by curve 144, light from the edge of the display is bluer than light from the middle of the display. Each mark along the X-axis indicates the border of a respective cell 38C. As shown, light exiting from the two cells closest to the edge of the display is bluer than the remaining cells in the display. This example is merely illustrative, and light exiting from any desired number of cells may be bluer than the remaining cells in the display depending on the specific display design. The curve shown in FIG. 18 is merely illustrative and may have a different shape if desired.

Figure 19:
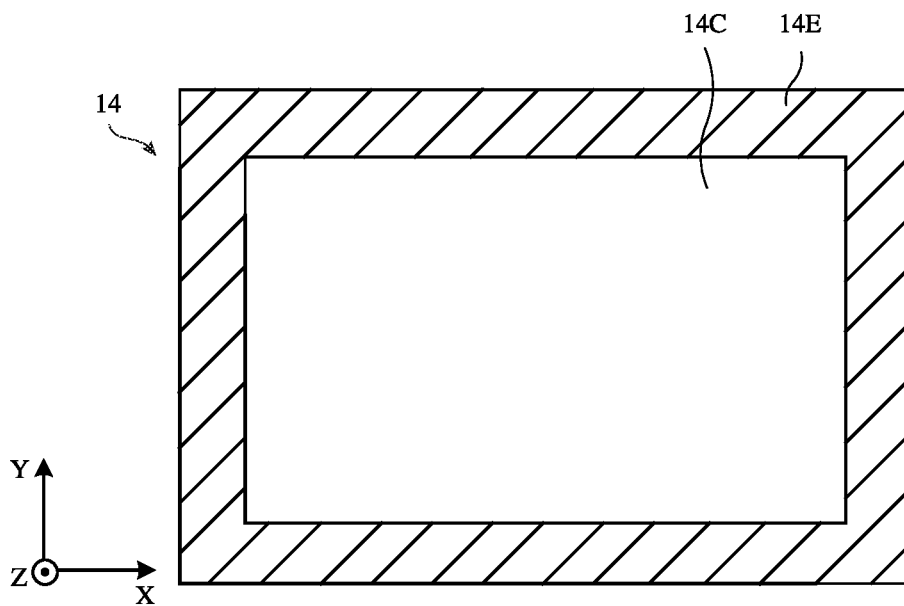
FIG. 19 is a top view of an illustrative display with more blue light emitted in the edges of the display in accordance with an embodiment.

FIG. 19 is a top view of an illustrative display showing how the light exiting from an edge region 14E may be bluer than light exiting from a central portion 14C of the display. The blue edge region 14E may extend around the periphery of the display.

Figure 20:
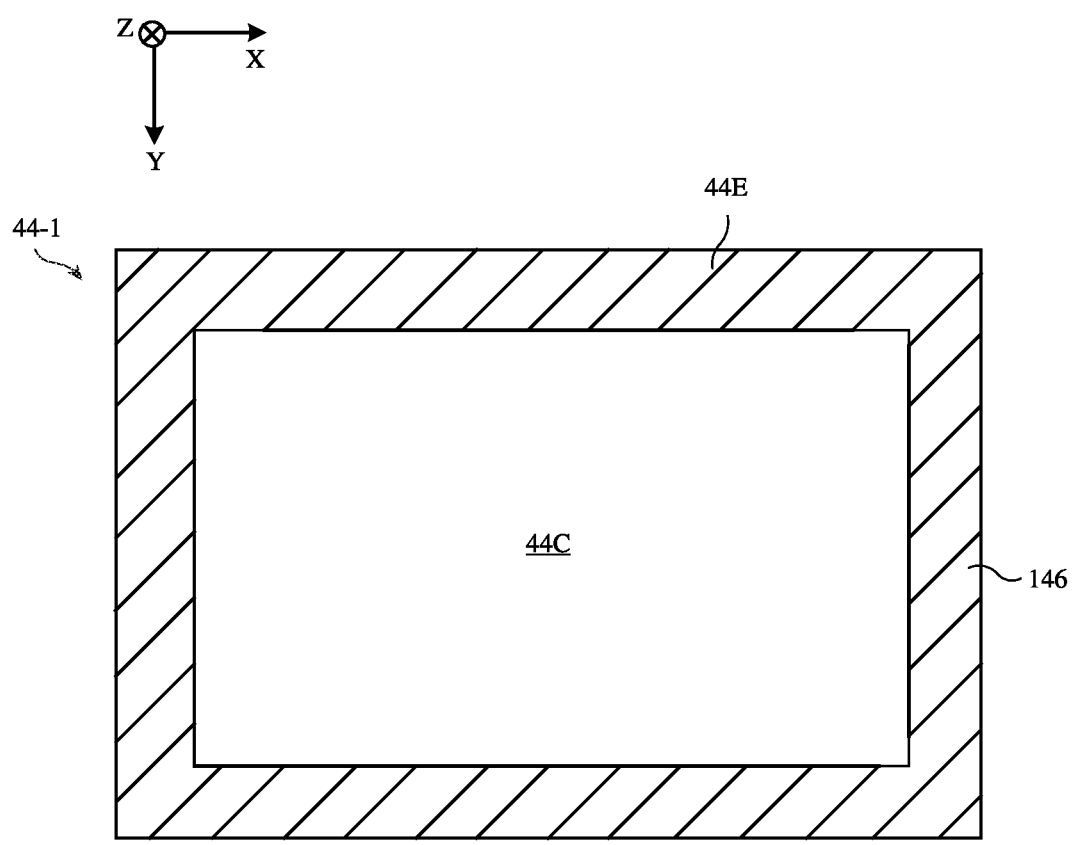
FIG. 20 is a top view of an illustrative brightness enhancement film with an edge portion having a yellow ink coating in accordance with an embodiment.

To mitigate the color non-uniformity of the emitted light from the display, a yellow ink pattern may be applied to the edges of one or both of the brightness enhancement films 44 in the backlight unit. FIG. 20 is a top view of the rear surface (i.e., a rear view) of a brightness enhancement film 44 such as brightness enhancement film 44-1 in FIG. 4 or FIG. 11. As shown in FIG. 20, brightness enhancement film 44-1 may have a ring-shaped edge region 44E that extends around the periphery of the brightness enhancement film 44-1 (which has approximately the same footprint as the display). A yellow ink 146 may be formed in edge region 44E to compensate for the otherwise bluish border of the display. Yellow ink 146 may be patterned on a lower surface of the brightness enhancement film, as an example.

Figure 21:
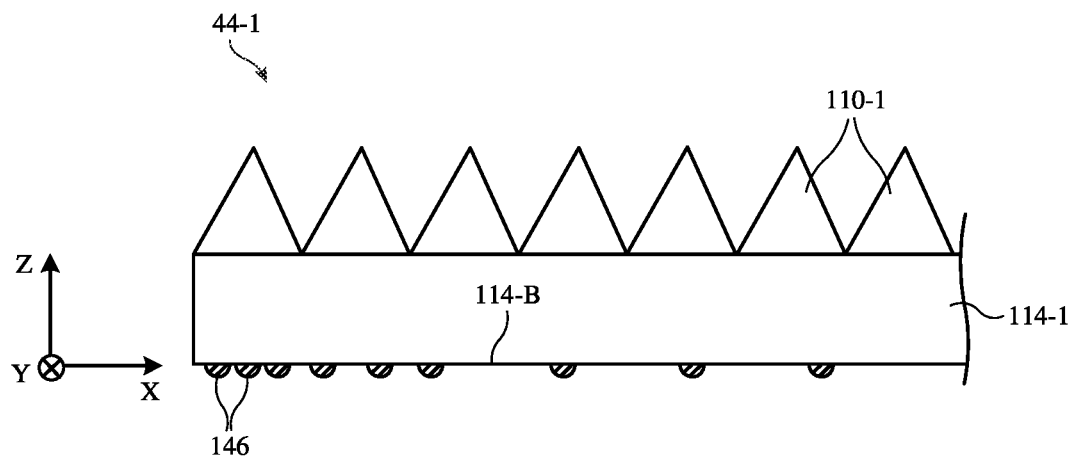
FIG. 21 is a cross-sectional side view of an illustrative brightness enhancement film with a yellow ink coating on a lower surface in accordance with an embodiment.

FIG. 21 is a cross-sectional side view of brightness enhancement film 44-1 with yellow ink patterned on a lower surface of base film portion 114-1. In this example, brightness enhancement film 44-1 has protrusions 110-1 (sometimes referred to as prisms or light redirecting structures) extending from a substrate 114-1. Substrate 114-1 may sometimes be referred to as base film portion and may be formed from a transparent material such as polyethylene terephthalate (PET) or any other desired material. Light redirecting structures 110-1 may be formed from the same material as base film portion 114-1 or may be formed from a different material than the base film portion. The protrusions 110-1 may extend in strips across the light spreading layer. For example, protrusions 110-1 may be elongated, parallel protrusions (sometimes referred to as ridges) that extend along a longitudinal axis across the layer (e.g., parallel to the Y-axis in FIG. 21).

Yellow ink dots 146 may be formed on a bottom surface 114-B of substrate 114-1. In other words, the yellow ink dots are formed on the opposite surface of substrate 114-1 as protrusions 110-1. Forming the yellow ink dots on the flat bottom surface 114-B of the substrate 114-1 may be easier from a manufacturing perspective than forming the yellow ink dots directly on protrusions 110-1. The yellow ink dots may absorb blue light and therefore compensate for the blue tint in the border of the display. As shown in FIG. 21, the density of the yellow ink dots may decrease with increasing separation from the edge of the brightness-enhancement film. The density of the yellow ink dots may follow a profile that mirrors the profile of the bluishness of the display (to optimally compensate the display at different positions).

Figure 22:
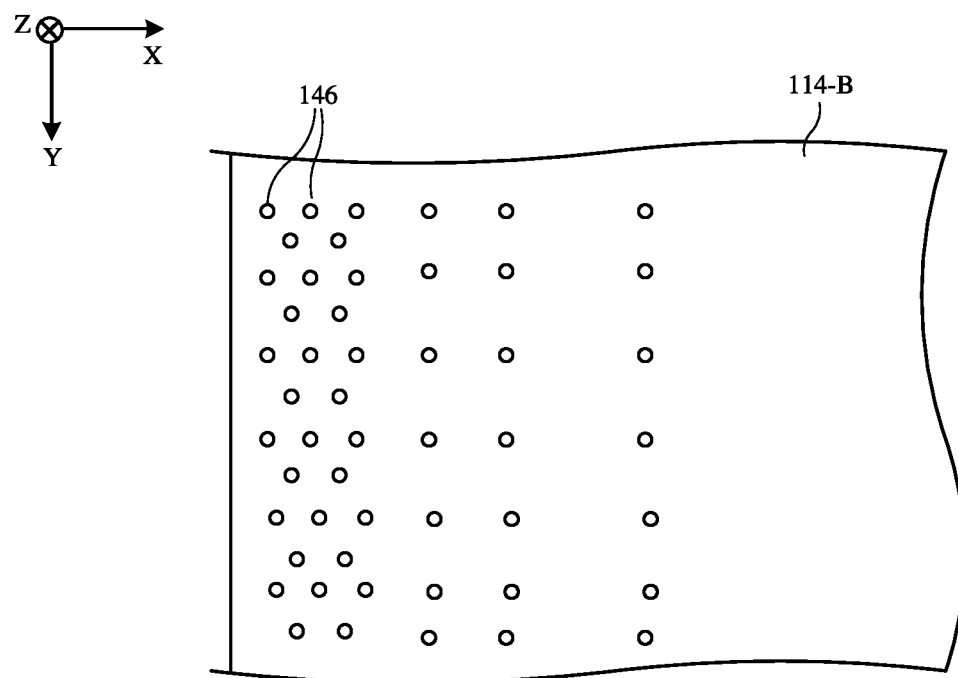
FIG. 22 is a rear view of an illustrative brightness enhancement film with a yellow ink coating on a lower surface in accordance with an embodiment.

FIG. 22 is a top view of the bottom surface 114-B of substrate 114-1 in brightness enhancement film 44-1. FIG. 22 shows how yellow ink dots 146 may be distributed across the brightness enhancement film. As shown in FIG. 22, the density of the yellow ink dots may decrease with increasing separation from the edge of the brightness-enhancement film.

Figure 23:
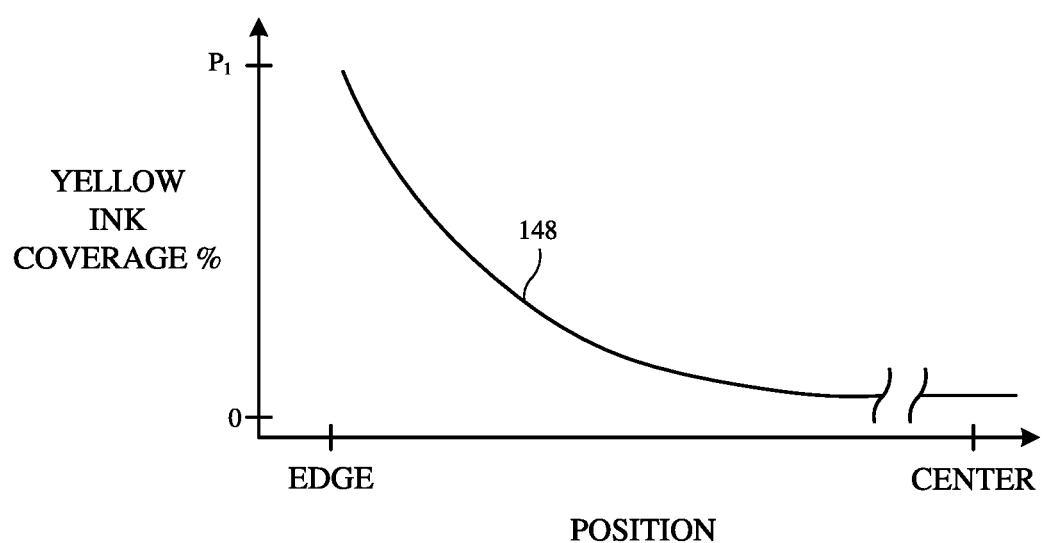
FIG. 23 is a graph illustrating how the yellow ink coverage percentage on a brightness enhancement film may follow a curved profile to provide output light of a uniform color in accordance with an embodiment.

FIG. 23 is a graph of the yellow ink coverage percentage as a function of position across the brightness enhancement film. As shown by profile 148, the yellow ink coverage percentage (e.g., the total percentage of each unit area of surface 114-B that is covered with yellow ink) has a maximum Pi at the edge of the brightness enhancement film. The coverage percentage then decreases with increasing separation from the edge of the brightness enhancement film according to a curved profile. The coverage percentage reaches 0% at a certain distance from the edge of the brightness enhancement film. As shown in FIG. 23, the center of the brightness enhancement film includes no yellow ink. The shape of profile 148 may match the shape of profile 144 in FIG. 18 to ensure a uniform display color from the center of the display to the edge of the display. The shape of the profile shown in FIG. 23 is merely illustrative. In general, the profile may have any desired shape.

In addition to mitigating edge color non-uniformity, the yellow ink on the brightness enhancement film has the added benefit of decreasing the coefficient of friction (COF) of the brightness enhancement film. In general, it may be desirable for the brightness enhancement film(s) to have a low coefficient of friction to prevent the film from wrinkling/buckling during operation of the display. As an example, normal operation of the display may result in the brightness enhancement films undergoing temperature changes that cause expansion and contraction of the film. In these scenarios, it is desirable for the brightness enhancement film not to buckle.

Figure 24:
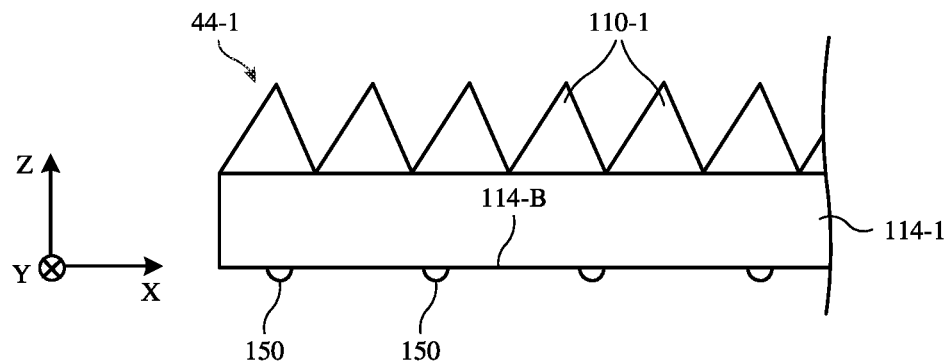
FIG. 24 is a cross-sectional side view of an illustrative brightness enhancement film with a clear ink coating on a lower surface in accordance with an embodiment.

The presence of ink dots on the lower surface of substrate 114-1 decreases the coefficient of friction for the lower surface of substrate 114-1. This effect may be leveraged for friction improvements even if color compensation is not desired or required in the display. For example, clear ink dots may be uniformly distributed across the lower surface of brightness enhancement film 44-1. FIG. 24 is a cross-sectional side view of an illustrative brightness enhancement film 44-1 with clear ink dots 150 evenly distributed across lower surface 114-B of substrate 114-1.

Figure 25:
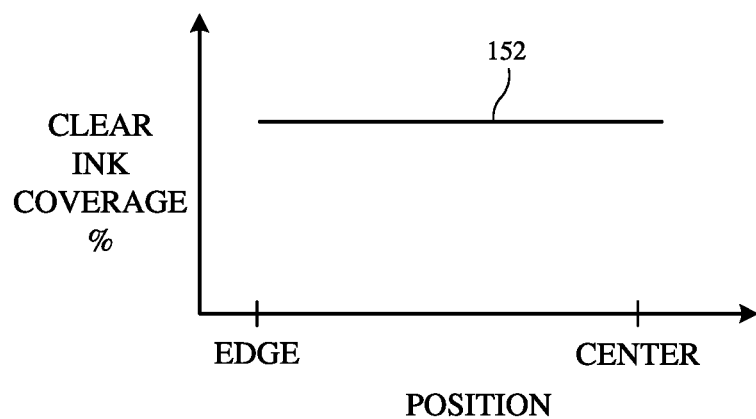
FIG. 25 is a graph illustrating how the clear ink coverage percentage on a brightness enhancement film may be constant across the film in accordance with an embodiment.

FIG. 25 is a graph of the clear ink coverage percentage as a function of position across the brightness enhancement film. As shown by profile 152, the clear ink coverage percentage (e.g., the total percentage of unit area of surface 114-B that is covered with clear ink) remains constant from the edge of the brightness enhancement film to the center of the brightness enhancement film. This profile is merely illustrative. If desired, clear ink dots may be distributed in a varying manner (e.g., with increasing density in the edges of the film as in FIG. 23) or according to any other desired profile.

Figure 26:
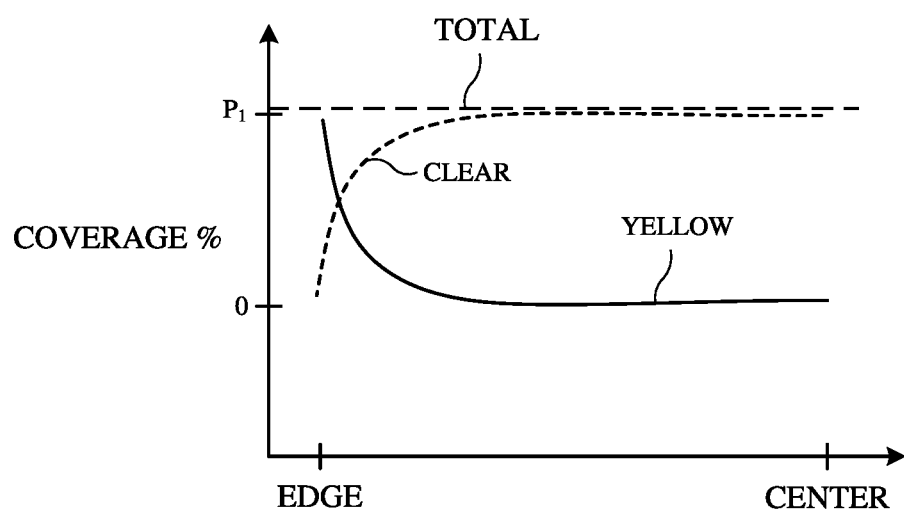
FIG. 26 is a graph illustrating how both yellow and clear ink may be included on a brightness enhancement film in accordance with an embodiment.

As yet another example, both yellow ink dots and clear ink dots may be printed on a single brightness enhancement film (for both the optical compensation described in connection with FIGS. 20-23 and maximizing the friction improvements described in connection with FIGS. 24 and 25). FIG. 26 is a graph of showing the coverage percentage of yellow and clear ink across the display. As shown, at the edge of the brightness enhancement film, there may be no clear ink (e.g., a coverage percentage of 0%) and the yellow ink coverage percentage may be at a magnitude Pi. At the center of the brightness enhancement film, there may be no yellow ink (e.g., a coverage percentage of 0%) and the clear ink coverage percentage may be at a magnitude Pi. The clear ink and yellow ink coverage percentage profiles may mirror each other such that the total ink coverage percentage remains constant cross the brightness enhancement film. In other words, the coverage percentage of yellow ink decreases with increasing distance from the edge of the brightness enhancement film whereas the coverage percentage of clear ink increases with increasing distance from the edge of the brightness enhancement film. The slopes of the profiles for the yellow and clear ink therefore may have the same magnitude but different signs at each position. The shapes of the profiles shown in FIG. 26 are merely illustrative. In general, the profiles may have any desired shapes.

The aforementioned examples of applying clear and/or yellow ink to the bottom surface of substrate 114-1 for brightness enhancement film 44-1 are merely illustrative. In general, yellow ink for optical compensation (or yellow ink and clear ink as described in connection with FIG. 26) may be applied to any surface of any optical film that is positioned above phosphor layer 40 in the backlight (e.g., as shown in FIG. 4). For example, yellow ink may be applied to film 108 in color conversion layer 34, brightness enhancement film 44-1, or brightness enhancement film 44-2. The yellow ink may be applied to the lower surface of an optical film or the upper surface of an optical film. Yellow ink may be applied to multiple optical films in the backlight unit (e.g., brightness enhancement film 44-1 and brightness enhancement film 44-2) if desired.

In general, clear ink for friction improvements may be applied to any surface of any optical film in the backlight (e.g., as shown in FIG. 4). For example, clear ink may be applied to one of light spreading layers 28-1, 28-2, and 28-3, color conversion layer 34, brightness enhancement film 44-1, or brightness enhancement film 44-2. The clear ink may be applied to the lower surface of an optical film or the upper surface of an optical film. Clear ink may be applied to multiple optical films in the backlight unit (e.g., brightness enhancement film 44-1 and brightness enhancement film 44-2) if desired.

As an example, yellow ink may be applied according to the gradient of FIG. 23 to the edges of the bottom surface of substrate 114-1 of brightness enhancement film 44-1 while clear ink may be applied uniformly across the bottom surface of substrate 114-2 of brightness enhancement film 44-2.

Figure 27:
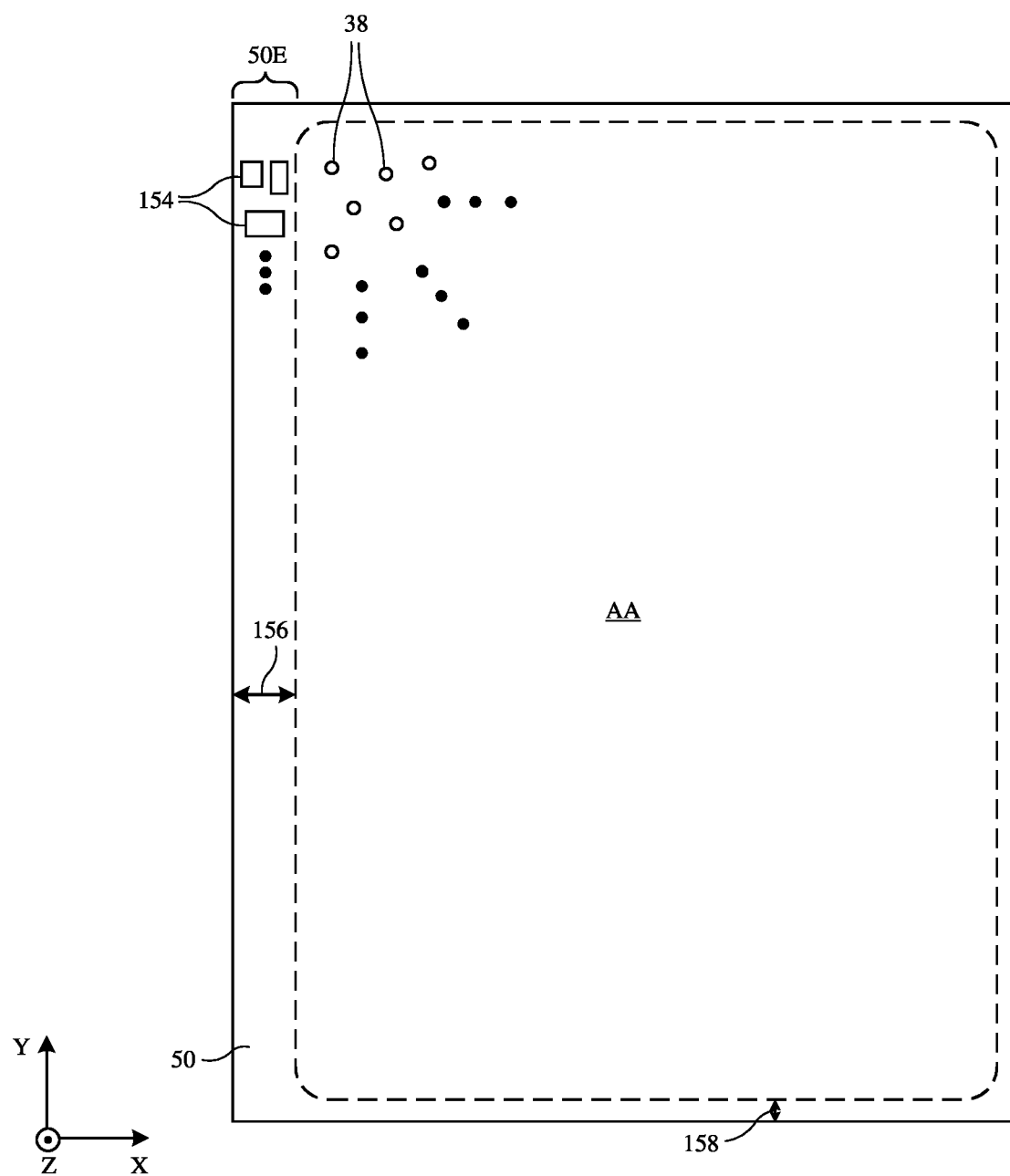
FIG. 27 is a top view of an illustrative backlight unit showing how electronic components may be formed in an inactive area along one edge of the printed circuit board in accordance with an embodiment.

FIG. 27 is a top view of an illustrative LED array with LEDs 38 formed across printed circuit board 50. This arrangement may be used in any of the backlight units described herein (e.g., the backlight of FIG. 4, the backlight of FIG. 11, etc.). As shown, LEDs 38 may be distributed across an active area (AA) of the display. The active area is the footprint of the display that actually emits light, and may be defined by an opaque masking layer in the display stack-up. Herein, the display, printed circuit board, backlight unit, optical films, and other desired display layers may all be referred to as having an active area. The active area of each layer may simply refer to the footprint of each layer that overlaps with the light-emitting area of the display. In the example of FIG. 27, the active area has rounded corners. This example is merely illustrative. In general, the active area may have any desired shape. Printed circuit board 50 may have an inactive area (e.g., an area that does not vertically overlap the light-emitting footprint of the display) in addition to the active area.

In addition to LEDs being mounted on printed circuit board 50, additional electronic components 154 (sometimes referred to as surface mount components) may be mounted to printed circuit board 50. The printed circuit board may have an edge 50E in the inactive area that includes components 154. Components 154 may include, for example, driving circuitry (e.g., one or more display driver integrated circuits) that is used to control LEDs 38 in the LED array. Components 154 may be attached to the upper surface of the printed circuit board using solder. As shown in FIG. 27, the components 154 are consolidated in one edge 50E of the printed circuit board. This allows only one edge of the printed circuit board to have a larger gap between the edge of the printed circuit board and the active area (e.g., distance 156 in FIG. 27). The remaining three edges of the printed circuit board have a smaller gap between the edge of the printed circuit board and the active area (e.g., distance 158 in FIG. 27).

Figure 28:
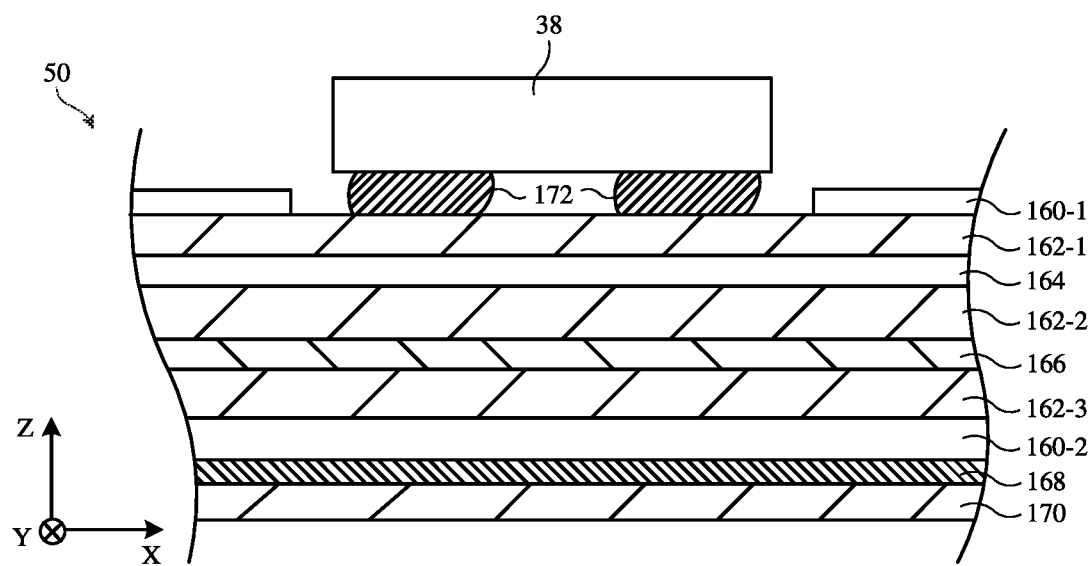
FIG. 28 is a cross-sectional side view of an illustrative printed circuit board having multiple highly reflective layers to improve efficiency in accordance with an embodiment.

To increase the efficiency of the backlight unit and display, it may be desirable for printed circuit board 50 to be as reflective as possible. To increase the reflectivity of printed circuit board 50, one or more layers in the printed circuit board may be formed from highly reflective materials. FIG. 28 is a cross-sectional side view of a highly reflective printed circuit board 50 that may be used in any of the backlight units described herein (e.g., the backlight of FIG. 4, the backlight of FIG. 11, etc.).

As shown in FIG. 28, printed circuit board 50 includes first, second, and third conductive layers 162-1, 162-2, and 162-3. These conductive layers may be patterned to form the desired conductive routing within the printed circuit board. The conductive layers may be formed from copper or another desired conductive material.

A solder resist layer 160-1 is formed on the upper surface of conductive layer 162-1. Solder resist layer 160-1 forms the top-most layer of the printed circuit board and therefore may be a key driver of the reflectivity of the printed circuit board. Accordingly, solder resist layer 160-1 may be formed from a white dielectric material that reflects the majority of incident light (e.g., a reflectivity greater than 60%, greater than 80%, greater than 90%, greater than 95%, greater than 98%, etc.).

Electronic components such as LED 38 may be mounted to conductive layer 162-1 using solder 172. In general, any desired components may be mounted on the upper surface of printed circuit board 50 in respective openings in solder resist layer 160-1.

Between conductive layers 162-1 and 162-2, a white core layer 164 is formed. In areas where solder resist layer 160-1 is removed to allow electronic components to be mounted, the white core layer 164 may be exposed as the upper-most surface of the printed circuit board. The white core may therefore also have a high reflectivity (e.g., a reflectivity greater than 60%, greater than 80%, greater than 90%, greater than 95%, greater than 98%, etc.) to increase the reflectivity of the printed circuit board. The white core may be thicker than the remaining layers (160-1, 162-1, 162-2, 166, 162-3, 160-2, 168, and 170) in the printed circuit board. The white core may be formed form a dielectric material that insulates conductive layer 162-1 from conductive layer 162-2.

Between conductive layers 162-2 and 162-3, a prepreg layer 166 (e.g., a dielectric layer that insulates conductive layer 162-2 from conductive layer 162-3) is formed. An additional solder resist layer 160-2 is formed beneath conductive layer 162-3. Solder resist layer 160-2 may be formed from a white dielectric material that reflects the majority of incident light (e.g., a reflectivity greater than 60%, greater than 80%, greater than 90%, greater than 95%, greater than 98%, etc.).

The dielectric constants of layers 160-1, 164, 166, and 160-2 may be selected to help mitigate parasitic capacitance. As one example, the dielectric constant for prepreg layer 166 may be lower than the dielectric constant for solder resist layer 160-2, the dielectric constant for solder resist layer 160-2 may be lower than the dielectric constant for white core layer 164, and the dielectric constant for white core layer 164 may be lower than the dielectric constant for solder resist layer 160-1. The thickness of solder resist layer 160-2 may be lower than the thickness of solder resist layer 160-1, the thickness of solder resist layer 160-1 may be lower than the thickness of prepreg layer 166, and the thickness of prepreg layer 166 may be lower than the thickness of white core layer 164. This type of arrangement may provide the printed circuit board with optimized reflectance and parasitic capacitance.

A conductive shield 170 may be attached to the lower surface of solder resist layer 160-2 using adhesive layer 168. Conductive shield 170 may be formed from copper or any other desired conductive material. Adhesive layer 168 and conductive shield 170 may be considered part of the printed circuit board or may be considered to be attached to a lower surface of the printed circuit board.

Figure 29:
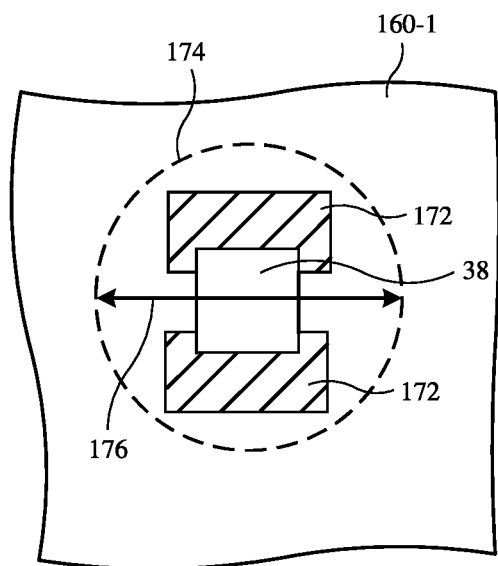
FIG. 29 is a top view of an illustrative printed circuit board showing how a light-emitting diode may be mounted to the printed circuit board in a circular opening in a solder resist layer on the printed circuit board in accordance with an embodiment.

In one arrangement, shown in FIG. 29, each LED may be mounted to printed circuit board 50 in a respective circular opening 174 in solder resist layer 160-1. Solder 172 may attach the LED to the conductive layers (e.g., conductive layer 162-1) of printed circuit board 50 that are exposed within opening 174 (sometimes referred to as solder resist opening 174). In FIG. 29, opening 174 is a circular opening having a diameter 176. However, the reflectance of the printed circuit board may be slightly lower in the opening area than in the areas covered by solder resist layer 160-1. To increase reflectivity of the printed circuit board (and, accordingly, efficiency of the display), the printed circuit board may instead include rectangular solder resist openings 174 as shown in FIG. 30.

Figure 30:
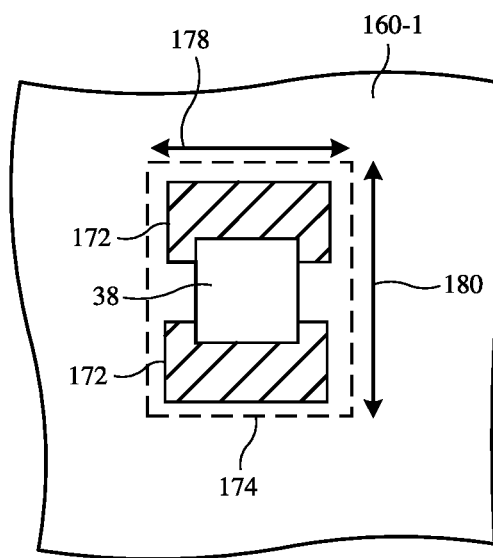
FIG. 30 is a top view of an illustrative printed circuit board showing how a light-emitting diode may be mounted to the printed circuit board in a rectangular opening in a solder resist layer on the printed circuit board in accordance with an embodiment.

Rectangular openings 174 in FIG. 30 have a width 178 and height 180. Both width 178 and height 180 may be lower than diameter 176 in FIG. 29. As one example, width 178 may be less than 500 microns, less than 400 microns, between 300 and 400 microns, or any other desired distance. Height 180 may be less than 600 microns, less than 500 microns, between 400 and 500 microns, or any other desired distance. In one example, the circular opening in FIG. 29 has a diameter of 500 microns and the rectangular opening of FIG. 30 is 350 microns by 450 microns. The rectangular opening is approximately 80% of the total size of the circular opening in this example. This reduced opening size increases the reflectance of the printed circuit board which in turn increases the efficiency of the display.

The shape and dimensions of the solder resist openings in FIGS. 29 and 30 are merely illustrative. In general, a solder resist opening of any desired shape (e.g., square, non-square rectangular, circular, etc.) and dimensions may be used.

Figure 31:
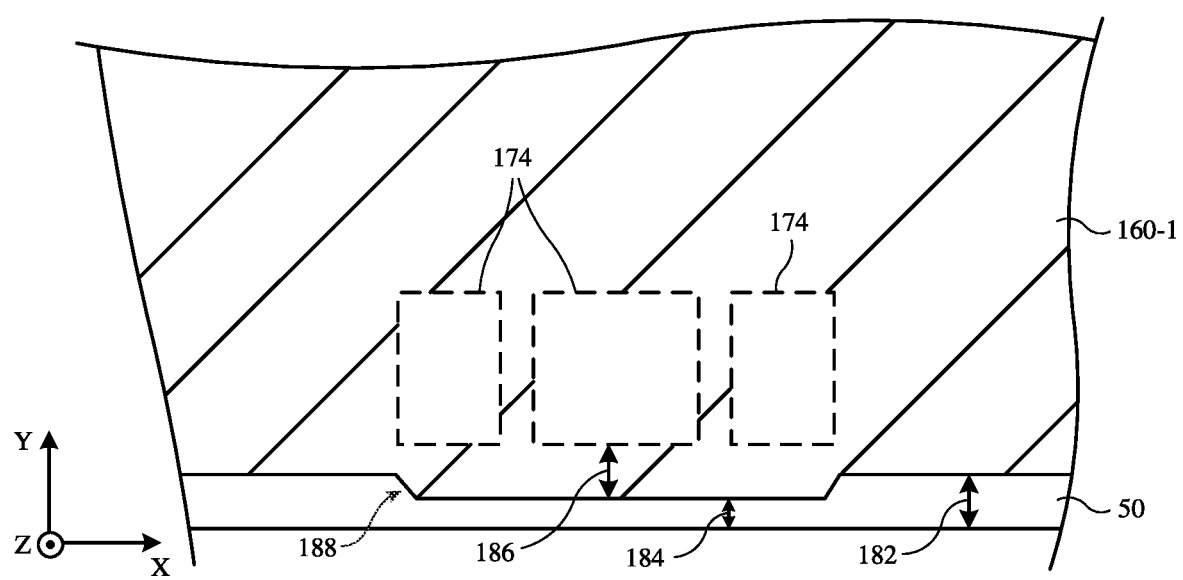
FIG. 31 is a top view of an illustrative printed circuit board showing how a solder resist layer may have a locally protruding portion that extends towards the edge of the printed circuit board in accordance with an embodiment.

FIG. 31 is a top view of printed circuit board 50 showing how the solder resist layer 160-1 may be selectively extended towards the edge of the printed circuit board to prevent delamination. As shown in FIG. 31, solder resist layer 160-1 may, in general be separated from the edge of printed circuit board 50 by distance 182. However, in some locations, there may be tightly spaced components close to the edge of the printed circuit board that require tightly spaced solder resist openings 174 close to the edge of the printed circuit board. Due to the small surface area of the remaining solder resist layer between the solder resist openings, there is a risk of delamination of the solder resist layer during operation of the display if the same solder-resist-to-edge gap 182 was maintained in this region.

To prevent delamination, the solder resist layer may have a locally protruding portion 188 (sometimes referred to as tab 188) that extends closer to the edge of the printed circuit board. As shown in FIG. 31, tab 188 is separated from the edge of printed circuit board by distance 184 that is less than distance 182. This results in the solder resist layer having a width 186 between openings 174 and the edge of the solder resist layer. This increased width 186 (relative to if the tab was not included) reduces the chances of delamination during operation.

Distance 184 may be less than 300 microns, less than 200 microns, less than 150 microns, less than 120 microns, more than 100 microns, more than 50 microns, between 50 and 150 microns, between 100 and 110 microns, or any other desired distance. Distance 186 may be less than 300 microns, less than 200 microns, less than 150 microns, more than 100 microns, more than 120 microns, more than 140 microns, between 125 and 175 microns, between 140 and 150 microns, or any other desired distance. Distance 182 may be less than 300 microns, less than 200 microns, less than 150 microns, more than 100 microns, more than 50 microns, between 125 and 175 microns, between 140 and 160 microns, or any other desired distance.

Figure 32:
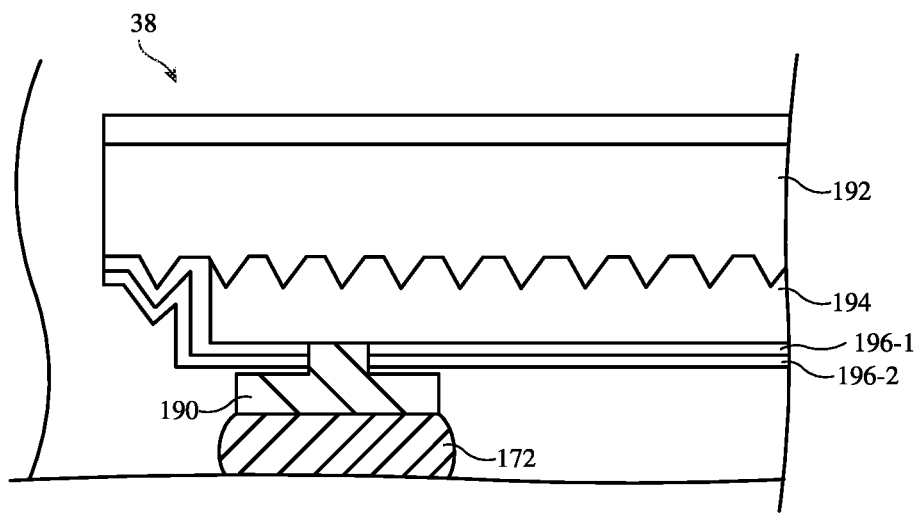
FIG. 32 is a cross-sectional side view of a light-emitting diode mounted to a printed circuit board showing how first and second passivation layers may be formed on a lower surface of the light-emitting diode in accordance with an embodiment.

FIG. 32 is a cross-sectional side view of an illustrative light-emitting diode. As shown, each light-emitting diode 38 may be formed as a light-emitting diode package that is attached to the underlying printed circuit board using solder 172. The light-emitting diode package 38 has a package substrate 192 and LED layers 194 formed on the package substrate. LED substrate 192 may be formed from sapphire, gallium nitride (GaN), gallium arsenic (GaAs), silicon, or any other desired semiconductor and dielectric materials. Substrate 192 may be patterned to include protrusions as shown in FIG. 32. LED layers 194 may include one or more n-type semiconductor layer(s) and/or one or more p-type semiconductor layers on LED substrate 192. The n-type semiconductor layer(s) may include materials such as n-type doped gallium nitride (GaN), n-type aluminum gallium indium phosphide (AlGaInP), etc. The n-type semiconductor layer(s) may be an epitaxial layer (e.g., formed using epitaxy-type crystal growth/material deposition). The p-type semiconductor layer(s) may include p-type doped gallium nitride (GaN) or any other desired material. The p-type semiconductor layer(s) may be an epitaxial layer (e.g., formed using epitaxy-type crystal growth/material deposition). The LED layers may conform to the patterned surface of substrate 192.

The LED package may also include one or more passivation layers to prevent solder overflow from electrically connecting (shorting) to the LED layers 194 in the package. As shown in FIG. 32, the LED includes a first passivation layer 196-1 (sometimes referred to as dielectric layer 196-1, coating 196-1, etc.) and a second passivation layer 196-2 (sometimes referred to as dielectric layer 196-2, coating 196-2, etc.).

The first passivation layer 196-1 directly contacts the substrate 192 and conforms to the protrusions of the patterned surface of substrate 192. The passivation layer 196-1 may be formed from any desired material (e.g., aluminum oxide ($Al_2O_3$) or another desired material). The passivation layer 196-1 may be applied using atomic layer deposition (ALD) to ensure there are no voids in the areas between the protrusions of the patterned surface of substrate 192. Passivation layer 196-1 may therefore sometimes be referred to as an ALD aluminum oxide layer. The passivation layer 196-2 may be formed from any desired material (e.g., silicon dioxide ($SiO_2$) or another desired material). The passivation layer 196-2 may be applied using plasma-enhanced chemical vapor deposition (PECVD). Passivation layer 196-2 may therefore sometimes be referred to as an PECVD silicon dioxide layer.

Passivation layer 196-1 is interposed between (and in direct contact with) substrate 192 and passivation layer 196-2 at the edge of the package. Passivation layer 196-1 is interposed between (and in direct contact with) LED layers 194 and passivation layer 196-2 in a central portion of the package. Passivation layer 196-2 may be adjacent to additional dielectric and/or reflective layers. For example, passivation layer 196-2 may be adjacent to a physical vapor deposition (PVD) $SiO_2/TiO_2$ coating.

As previously shown in FIG. 27, additional electronic components 154 (sometimes referred to as surface mount components) may be mounted to an edge of printed circuit board 50. During a drop event, one or more optical films 26 in the backlight unit may shift into the edge of the printed circuit board with the electronic components 154. If care is not taken, one of the optical films may strike an electronic component 154 and dislodge the component from the printed circuit board. To ensure the reliability of components 154, mechanical structures may be included in the edge of the printed circuit board to prevent the components from being dislodged during a drop event.

Figure 33:
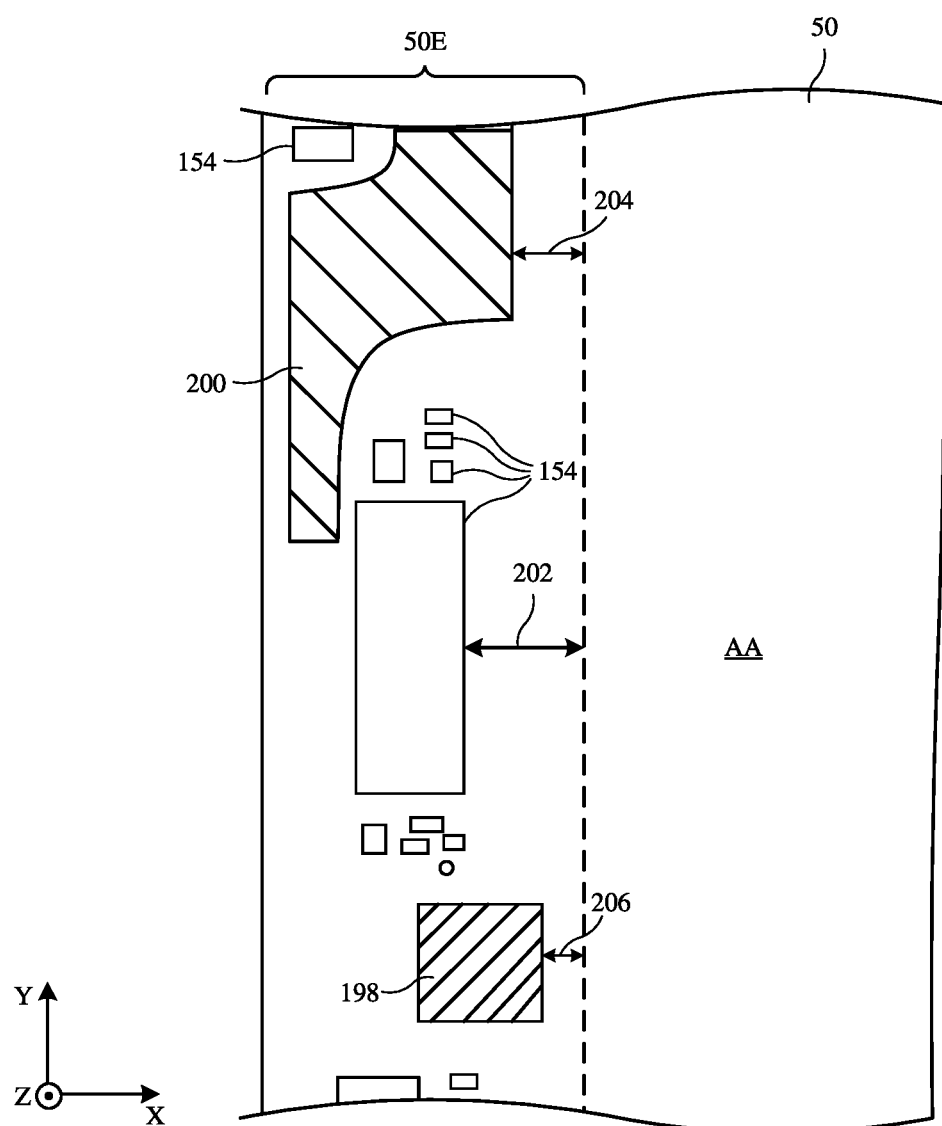
FIG. 33 is a top view of an illustrative printed circuit board showing how standoffs may be formed in the inactive area to protect electronic components from damage in accordance with an embodiment.

FIG. 33 is a top view of a display that includes mechanical structures to protect electronic components in the edge of the display. As shown in FIG. 33, a plurality of electronic components 154 are attached to the edge portion 50E of printed circuit board 50. Each electronic component 154 may be electrically and mechanically connected to the printed circuit board using solder, as an example.

To protect electronic components 154, standoffs such as standoff 198 and standoff 200 may also be attached to the edge of the printed circuit board. The standoffs may sometimes be referred to as spacer structures, protection structures, standoff structures, buffer structures, bumper structures, etc. Standoff 198 may be a surface-mount technology (SMT) component that is attached to the printed circuit board using solder, whereas standoff 200 may be attached to the printed circuit board using adhesive. The standoffs are intended to absorb any potential impact from optical films 26 during a drop event and are therefore positioned closer to the active area AA than the active electronic components 154. As shown in FIG. 33, the distance 202 between the electronic components 154 (e.g., the closest electronic component to the border) and the border of the active area is greater than distances 204/206 between the standoffs and the border of the active area.

The printed circuit board may have available area where a conductive layer of the printed circuit board (e.g., copper layer 162-1 in FIG. 28) is not used for other routing/mounting and therefore may be available for mechanically securing the standoffs. Standoff 198 may be attached to available portions of conductive layer 162-1 using solder. Even when standoff 198 is attached to the printed circuit board using solder in this manner, the standoff serves only a mechanical function and does not serve any electrical function within the device. The standoff is simply meant to absorb any potential impact from optical films 26 during a drop event. The conductive portion of the printed circuit board to which standoff 198 is soldered may not be used to convey signals for the electronic device (e.g., a floating portion that is only used for attachment purposes).

Standoff 198 and electronic components 154 may both be attached to the printed circuit board using surface-mount technology (SMT). This may allow standoff 198 and electronic components 154 to be attached to the printed circuit board in the same manufacturing step (e.g., a single reflow) if desired.

Although forming the standoffs as SMT components may sometimes be convenient from a manufacturing perspective, there may be portions of the printed circuit board that have otherwise empty spaces (that are candidates for a standoff structure) but do not have available conductive layer for an SMT attachment. Standoffs 200 in these areas may therefore be attached using adhesive. Standoffs 200 may be attached to an upper surface of the printed circuit board such as solder-resist layer 160-1 (see FIG. 28) using adhesive. In general, any type of adhesive may be used (e.g., pressure sensitive adhesive, ultraviolet light curable (UV-curable) adhesive, etc.). Standoff 200 serves only a mechanical function and does not serve any electrical function within the device. The standoff is simply meant to absorb any potential impact from optical films 26 during a drop event.

Any desired number of standoffs 198 be attached to the edge 50E of the printed circuit board using solder (e.g., one standoff, two standoffs, more than two standoffs, more than three standoffs, more than five standoffs, more than ten standoffs, more than twenty standoffs, etc.). Any desired number of standoffs 200 be attached to the edge 50E of the printed circuit board using adhesive (e.g., one standoff, two standoffs, more than two standoffs, more than three standoffs, more than five standoffs, more than ten standoffs, more than twenty standoffs, etc.).

Figure 34:
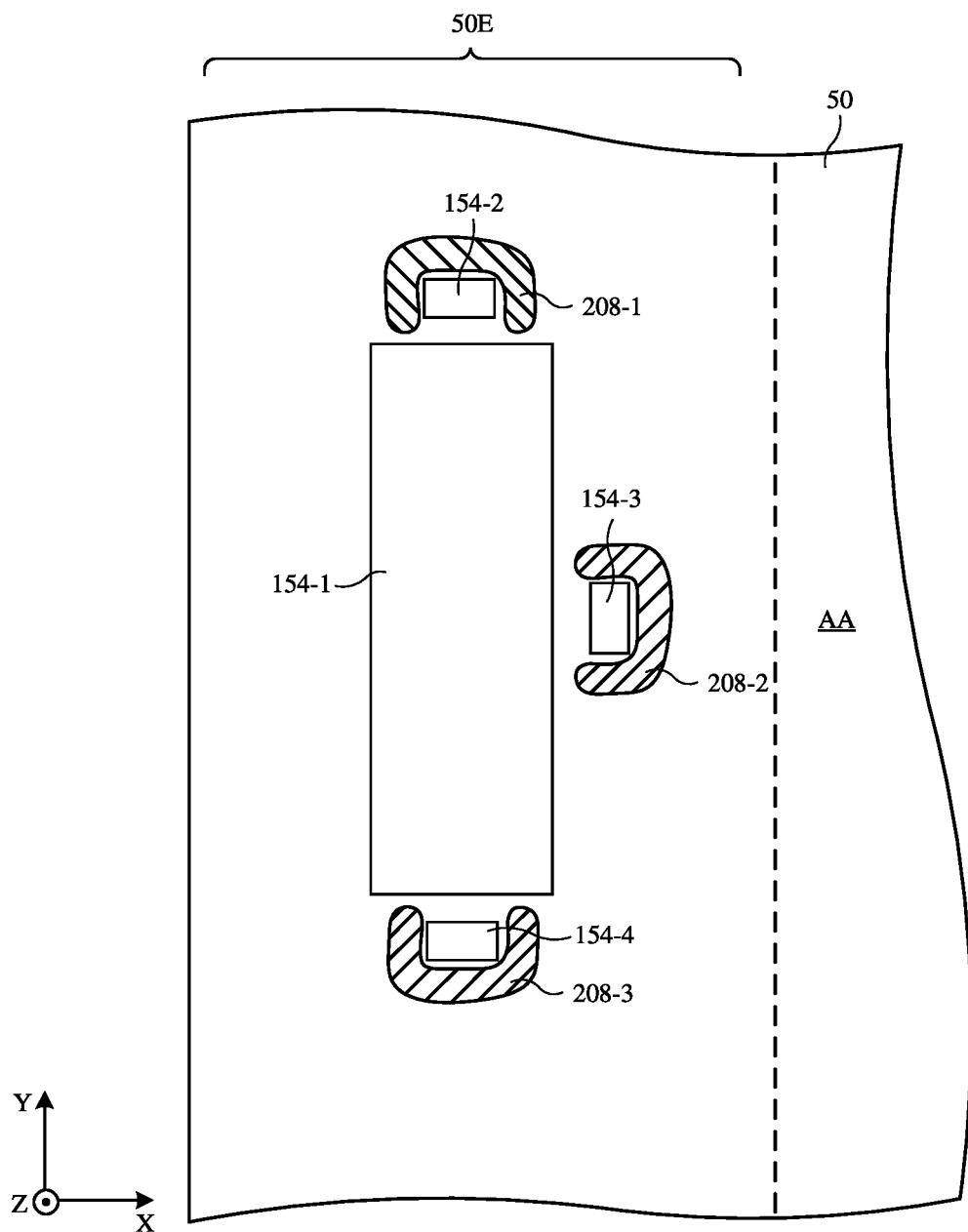
FIG. 34 is a top view of an illustrative printed circuit board showing how some electronic components in the inactive area may be surrounded on three sides by encapsulant in accordance with an embodiment.

FIG. 34 is a top view of printed circuit board 50 showing how certain components may have additional encapsulant to further protect the components during a drop event. FIG. 34 shows electronic components 154-1, 154-2, 154-3, and 154-4 mounted to edge 50E of printed circuit board 50. As one example, electronic component 154-1 may be a driver integrated circuit used to control LEDs 38 in the active area AA. Electronic components 154-2, 154-3, and 154-4 may include one or more of a capacitor, a resistor, an inductor, or any other desired component.

Electronic components 154-2, 154-3, and 154-4 may be at a high risk for being dislodged during a drop event. Accordingly, encapsulant may be formed around the components to provide additional physical protection for the components. Encapsulant 208-1 is formed around electronic component 154-2, encapsulant 208-2 is formed around electronic component 154-3, and encapsulant 208-3 is formed around electronic component 154-4.

As shown in FIG. 34, each encapsulant portion may surround a respective electronic component on three sides, with the side of the electronic component adjacent/closest to electronic component 154-1 being left open. Using the three-sided encapsulant as in FIG. 34 may prevent the encapsulant from undesirably contacting component 154-1 (which may cause additional reliability issues). Therefore, encapsulant 208-1 is formed on three sides of component 154-2 but is not interposed between components 154-2 and 154-1 (e.g., is not formed on the fourth side of component 154-2). Encapsulant 208-2 is formed on three sides of component 154-3 but is not interposed between components 154-3 and 154-1 (e.g., is not formed on the fourth side of component 154-3). Encapsulant 208-3 is formed on three sides of component 154-4 but is not interposed between components 154-4 and 154-1 (e.g., is not formed on the fourth side of component 154-4).

Figure 35:
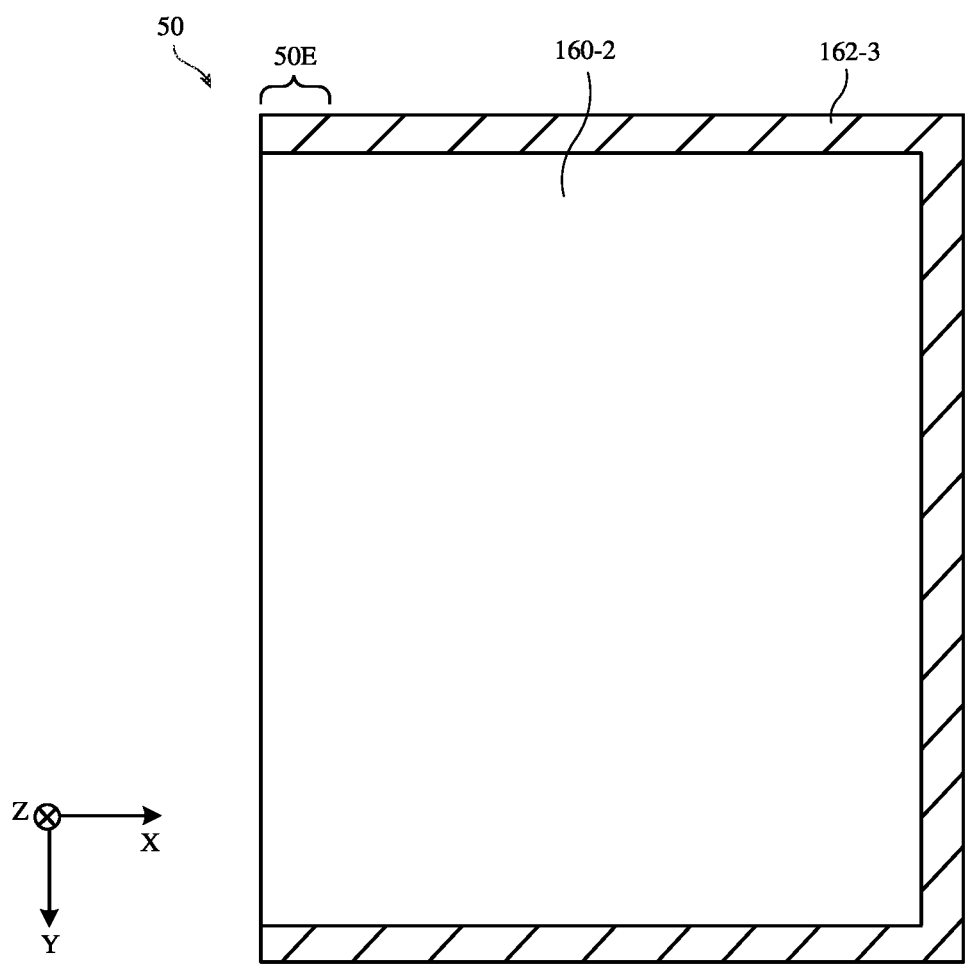
FIG. 35 is a rear view of an illustrative printed circuit board showing how a conductive layer in the printed circuit board may be exposed along three edges of the printed circuit board in accordance with an embodiment.

As shown in FIG. 28, the printed circuit board may include a shielding layer that is electrically connected to ground. This shielding layer may therefore ground the printed circuit board and provide shielding for the printed circuit board. The shielding layer may be electrically connected to an exposed portion of conductive layer 162-3 within the printed circuit board. FIG. 35 is a top view of a rear surface (i.e., a rear view) of the printed circuit board 50 showing how conductive layer 162-3 is exposed at the edges of the printed circuit board. Solder resist layer 160-2 may cover the majority of the footprint of the printed circuit board. However, solder resist layer 160-2 is removed along three of the four edges of the printed circuit board to expose conductive layer 162-3, as shown in FIG. 35.

The conductive layer 162-3 may be exposed (and electrically connected to a shielding layer) along three edges of the printed circuit board. However, the conductive layer 162-3 is not exposed (or electrically connected to a shielding layer) along edge 50E that includes electronic components 154 in an inactive area (as shown in FIG. 27, for example). This may prevent interference with the electronic components in the inactive area of edge 50E.

Figure 36:
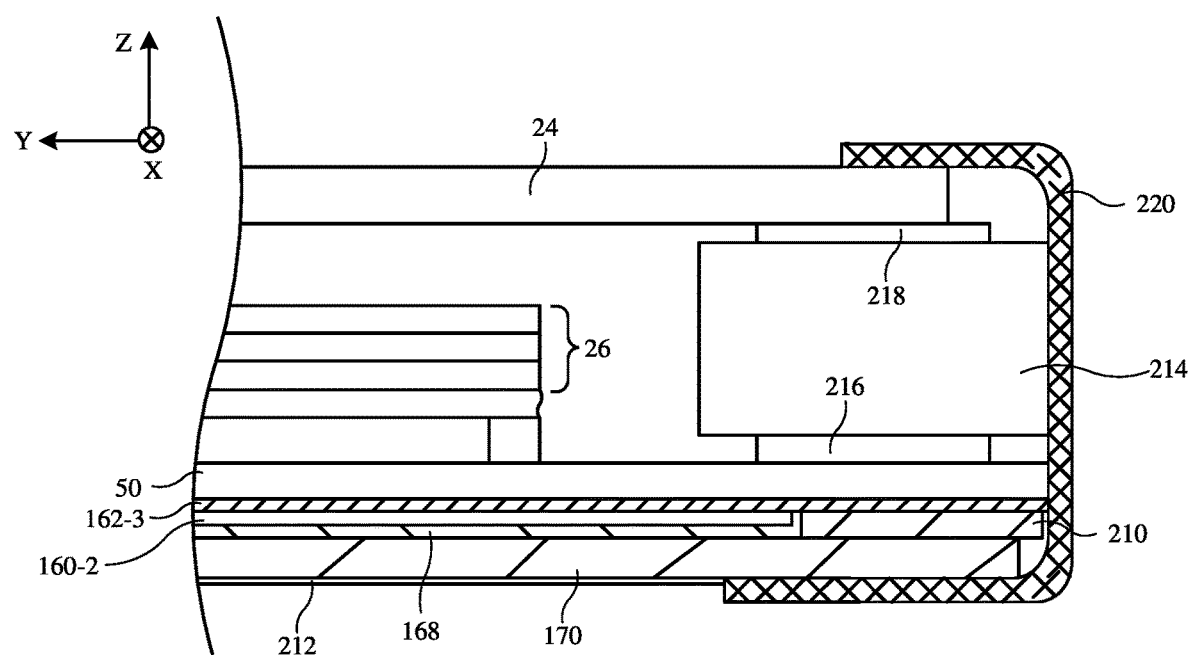
FIG. 36 is a cross-sectional side view of an illustrative display showing various grounding structures in the display in accordance with an embodiment.

FIG. 36 is a cross-sectional side view of an illustrative display showing how the exposed conductive layer in the printed circuit board is electrically connected to a shielding layer. As shown in FIG. 36, solder resist layer 160-2 of printed circuit board 50 is removed along an edge of the printed circuit board to expose conductive layer 162-3. The conductive layer 162-3 in this exposed area may be electrically connected to shielding layer 170 by conductive adhesive layer 210. Conductive adhesive layer 210 is therefore formed along three edges of the printed circuit board (e.g., following the C-shaped footprint of FIG. 35). Conductive adhesive layer 210 may be a conductive pressure sensitive adhesive or any other desired type of conductive adhesive.

Adhesive layer 210 mechanically and electrically connects conductive layer 162-3 to shielding layer 170. An additional adhesive layer 168 (e.g., a dielectric adhesive layer) may be interposed between solder resist-layer 160-2 and shielding layer 170. In other words, a conductive adhesive layer attaches the shielding layer to the printed circuit board in areas of the printed circuit board where conductive material is exposed on a lower surface and a dielectric adhesive layer attaches the shielding layer to the printed circuit board in areas of the printed circuit board where insulating material is exposed.

Adhesive layer 168, adhesive layer 210, and conductive shield 170 may be considered part of the printed circuit board 50 or may be considered to be attached to a lower surface of the printed circuit board 50.

Additional adhesive layer 168 may extend across the entire footprint of the printed circuit board. In other words, the adhesive layer 168 may attach the shielding layer 170 in all the regions of the printed circuit board where conductive layer 162-3 is not exposed (and solder resist layer 160-2 is therefore exposed). Adhesive layer 210 may attach the shielding layer 170 in all the regions of the printed circuit board where conductive layer 162-3 is exposed. Adhesive layer 168 is not conductive and may be referred to as a dielectric adhesive layer. Adhesive layer 168 may be a pressure sensitive adhesive or any other desired type of adhesive.

Adhesive layer 168 may have a low dielectric constant to reduce capacitance and thereby save power. For example, adhesive layer 168 may have a dielectric constant that is less than 4, less than 3, less than 2.5, between 2 and 3, or any other desired dielectric constant. Adhesive layer 168 may also have a low water permeability to prevent water from reaching printed circuit board 50 and causing issues such as browning. Adhesive layer 168 may have a water vapor transmission rate (WVTR) (measured at 40 degrees Celsius and 100% relative humidity in units of $g/m^2/day$) of less than 200, less than 100, less than 75, less than 50, more than 25, between 25 and 75, between 40 and 50, or any other desired magnitude.

A layer of black ink 212 may optionally be formed on the shielding layer 170. Shielding layer 170 in FIG. 36 may be formed from copper and may therefore sometimes be referred to as copper foil 170. Copper foil 170 may have a thickness of less than 20 microns, less than 15 microns, less than 10 microns, more than 5 microns, between 5 and 20 microns, between 5 and 15 microns, or any other desired thickness.

FIG. 36 also shows how a chassis 214 may be formed on the printed circuit board 50. Chassis 214 may be a plastic chassis (sometimes referred to as a p-chassis) that supports other layers (e.g., layers in backlight structures 42 and/or pixel array 24) in the display. Chassis 214 may extend around the periphery of printed circuit board with a central opening in which the LED array is formed (e.g., chassis 214 may be ring-shaped). In one possible arrangement, chassis 214 may have a C-shaped footprint similar to the footprint of exposed conductive layer 162-3 and conductive adhesive layer 210 (as shown in FIG. 35). In other words, the chassis extends along three edges of the printed circuit board but does not extend along edge 50E of the printed circuit board.

Chassis 214 may be attached to printed circuit board using adhesive layer 216. One or more layers within the electronic device (such as pixel array 24) may be attached to chassis 214 (e.g., the upper surface of the chassis) using an adhesive layer such as adhesive layer 218. Any desired type of adhesive (e.g., pressure sensitive adhesive) may be used for adhesive layers 216 and 218.

As shown in FIG. 36, a conductive tape layer 220 may be attached to the lower surface of copper foil 170, wrap around p-chassis 214 (contacting the side surface of p-chassis 214), and attach to pixel array 24. Conductive tape 220 may electrically connect portions of pixel array 24 to ground. Conductive tape 220 may include indium tin oxide (ITO) and may be referred to as ITO tape 220. Conductive tape 220 may include any other desired material(s).

To summarize, the exposed portion of conductive layer 162-3 in printed circuit board 50, conductive adhesive layer 210, shielding layer 170, and conductive tape 220 may all form part of the grounding structures for backlight unit 42 and/or pixel array 24. The grounding structures may also be used to electrically shield the backlight unit and/or the pixel array. One or more of these grounding components may be electrically connected to other grounding structures within the device (e.g., a conductive housing structure).

Figure 37:
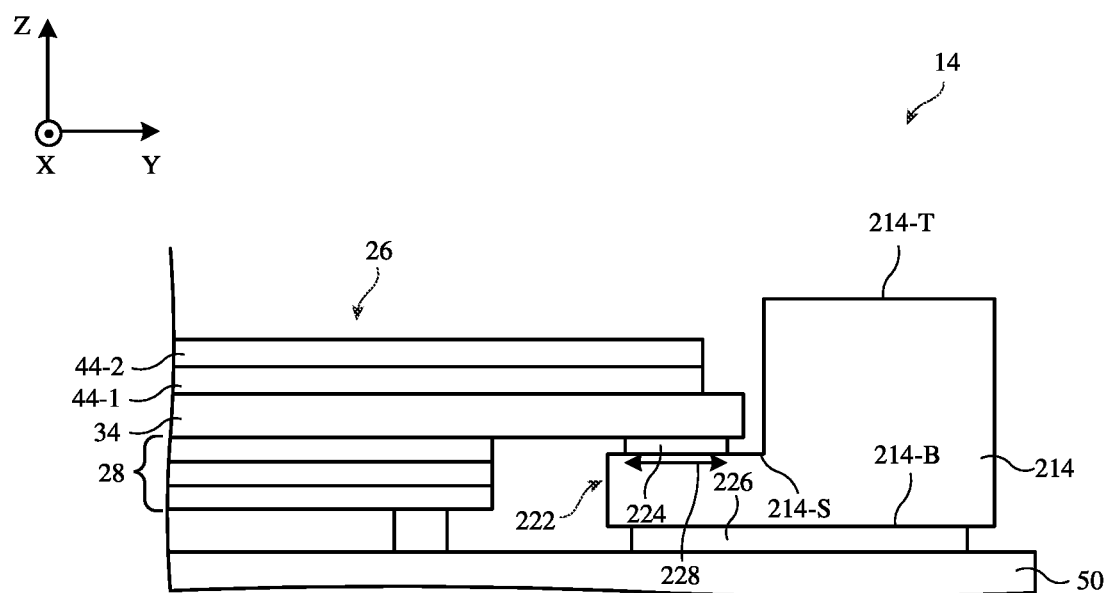
FIG. 37 is a cross-sectional side view of an illustrative display showing how a chassis in the display may have a shelf along an edge of the display that is attached to one of the optical films in the backlight unit in accordance with an embodiment.

FIG. 37 is a cross-sectional side view of a backlight unit in a display showing how an optical film may be attached to a shelf in the p-chassis. As previously mentioned, it is desirable to prevent damage to electronic components 154 in edge 50E of printed circuit board (in the inactive area of the display) in a drop event. To help prevent the optical films in the backlight unit from shifting during a drop event, one of the optical films may be attached to a shelf in the p-chassis.

As shown in FIG. 37, chassis 214 has a top surface 214-T and a bottom surface 214-B. Chassis 214 also has a protruding portion 222 that forms a shelf surface 214-S. Surface 214-S may be parallel (e.g., plane parallel) to surface 214-T, surface 214-B and the XY-plane in FIG. 37. Surface 214-S is interposed between surfaces 214-B and 214-T.

One of the optical films 26 in the backlight unit is mounted on shelf surface 214-S. In the example of FIG. 37, the backlight unit has optical films having the arrangement of FIG. 4, with three light spreading layers, a color conversion layer 34, and first and second brightness enhancement films 44-1 and 44-2. In this example, color conversion layer 34 is attached to shelf surface 214-S of chassis protrusion 222 using adhesive layer 224. Color conversion layer 34 may be the thickest layer of the optical films 26. Color conversion layer 34 may therefore have the most momentum during a drop event and may the most susceptible optical film to shift and damage components in edge 50E of the printed circuit board. Therefore, color conversion layer 34 (the thickest layer) may be selected as the optical film to be attached directly to chassis 214. This example is merely illustrative. In general, any one of the optical films 26 may be directly attached to chassis 214 using adhesive.

An adhesive layer 226 may also attach chassis 214 to the upper surface of printed circuit board 50. Any desired type of adhesive (e.g., pressure sensitive adhesive) may be used for adhesive layers 224 and 226. Adhesive layer 226 may optionally be formed integrally with adhesive layer 216 shown in FIG. 36.

Figure 38:
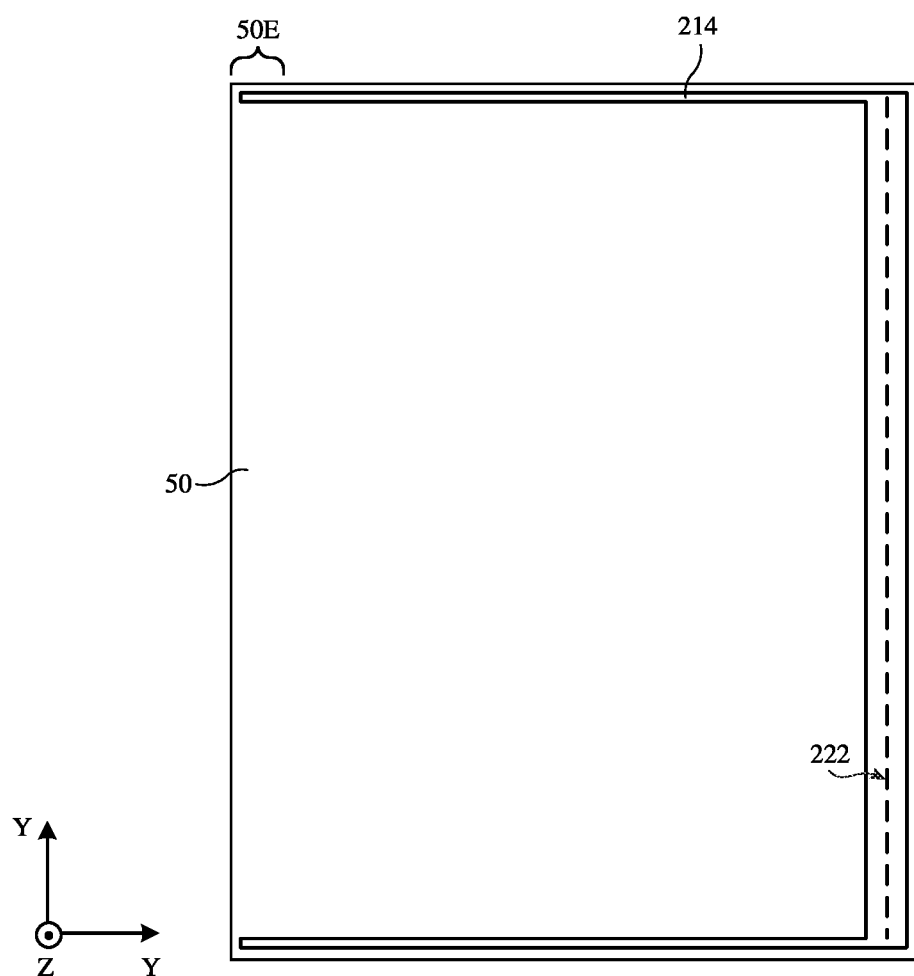
FIG. 38 is a top view of an illustrative backlight unit showing how the chassis may extend along only three edges of the printed circuit board in accordance with an embodiment.

Only one edge of the p-chassis 214 may have protrusion 222 to provide a shelf for one of the optical films. FIG. 38 is a top view of chassis 214. As shown, the p-chassis extends along three sides of the printed circuit board and is omitted along the edge 50E of the printed circuit board with electronic components 154. Along the top edge and bottom edge of the printed circuit board, the chassis may have an arrangement of the type shown in FIG. 36 (without protrusion 222). Along the right edge of the printed circuit board (e.g., the edge opposing edge 50E), chassis 214 includes protrusion 222 to form a shelf for the optical film attachment (e.g., the chassis has the arrangement shown in FIG. 37). Forming the shelf opposite edge 50E helps prevent the optical films from shifting in the negative X-direction towards edge 50E and components 154 during a drop event.

The width of adhesive 228 between chassis protrusion 222 and color conversion film 34 may be greater than 0.2 millimeters, greater than 0.4 millimeters, greater than 0.6 millimeters, greater than 1.0 millimeters, less than 1.5 millimeters, between 0.5 and 1 millimeters, or any other desired distance. The adhesive 228 may extend along the entire right edge of the printed circuit board (e.g., from the upper edge to the lower edge). In other words, the length of adhesive 228 may be more than 80% of the length of the printed circuit board, more than 90% of the length of the printed circuit board, more than 95% of the length of the printed circuit board, etc.

Figure 39:
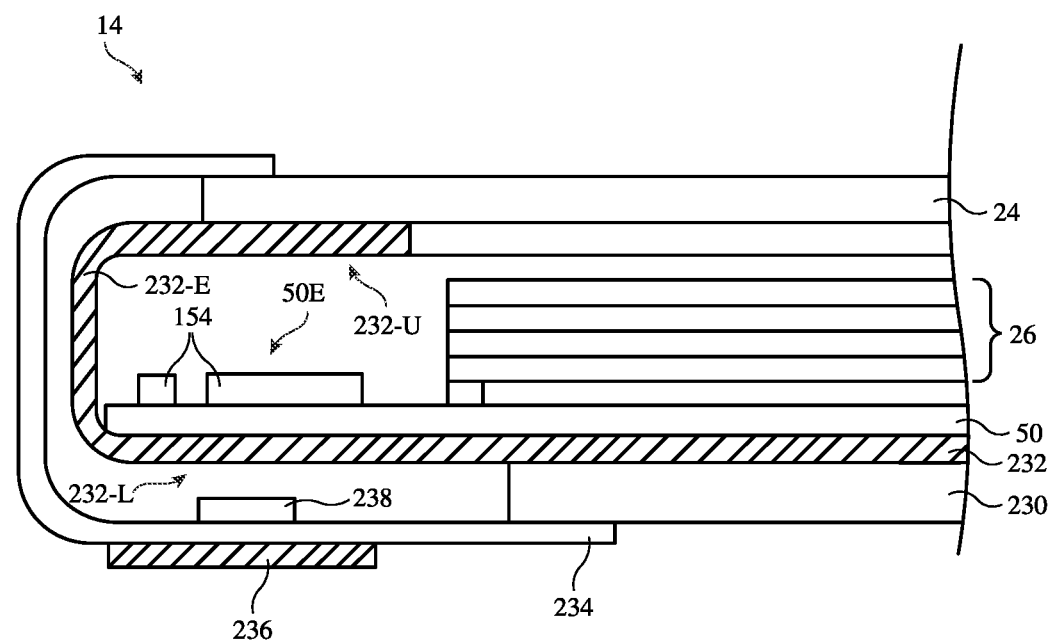
FIG. 39 is a cross-sectional side view of an illustrative display showing how a stainless steel stiffener may wrap around an edge of the printed circuit board in accordance with an embodiment.

FIG. 39 is a cross-sectional side view of display 14 showing how one or more metal stiffeners may be incorporated into the display. FIG. 39 shows edge 50E of printed circuit board 50 with corresponding electronic components 154. Optical films 26 are mounted over printed circuit board 50 in the active area of the display.

The electronic device may also include a printed circuit board 230 underneath printed circuit board 50 (with LEDs for the backlight unit). Printed circuit board 230 may be used for electrical components within the electronic device and sometimes may be referred to as a main board or motherboard. A flexible printed circuit board 234 may be electrically connected between printed circuit board 230 and pixel array 24. The flexible printed circuit board 234 wraps around the edge 50E of printed circuit board 50. A timing controller 238 (e.g., an integrated circuit) that is used to control pixel array 24 may be mounted on flexible printed circuit 234. To provide additional structural integrity to the flexible printed circuit board in an area overlapping timing controller 238, a stiffener 236 is attached to the lower surface of flexible printed circuit 234 underneath timing controller 238. Stiffener 236 may be formed from stainless steel or another desired material.

To protect electronic components 154 in edge 50E and provide the display with additional structural integrity, a stiffener 232 may be interposed between printed circuit board 50 and printed circuit board 230. Stiffener 232 may wrap around the edge 50E of printed circuit board. The stiffener 232 has an upper portion 232-U that is formed over and is vertically overlapping with components 154 in edge 50E, a lower portion 232-L that is formed underneath and is vertically overlapping with components 154 in edge 50E, and an edge portion 232-E that extends vertically to connect the upper portion 232-U and the lower portion 232-L. Upper portion 232-U is also attached to and provides mechanical support (e.g., at least partially supports) pixel array 24.

To help decouple stress between printed circuit board 50 and printed circuit board 230/flexible printed circuit 234/ timing controller 238, stiffener 232 may extend along the entire interface between printed circuit boards 50 and 230. The footprint of stiffener 232 may at least match the footprint of printed circuit board 230. Said another way, all or most of the footprint of printed circuit board 230 (e.g., greater than 80% of the footprint, greater than 90% of the footprint, greater than 95% of the footprint, greater than 99% of the footprint, etc.) may be vertically overlapped by stiffener 232. This reduces the stress applied to printed circuit board 50. Stiffener 232 may be formed from stainless steel or another desired material. The footprint of stiffener 232 may also at least match the footprint of printed circuit board 50. Said another way, all or most of the footprint of printed circuit board 50 (e.g., greater than 80% of the footprint, greater than 90% of the footprint, greater than 95% of the footprint, greater than 99% of the footprint, etc.) may be vertically overlapped by stiffener 232.

In some displays (e.g., as shown in FIG. 3), the light-emitting diodes for the display may be arranged in a grid. The light-emitting diodes may be arranged in evenly spaced rows and columns that extend along the entire display. This type of arrangement may be referred to as a square grid or a rectangular grid. However, having the light-emitting diodes arranged in a rectangular grid may result in visible artifacts (sometimes referred to as grid mura) when operating the display. To mitigate visible artifacts associated with the positioning of the light-emitting diodes in a grid, the positions of the light-emitting diodes may be dithered. In other words, the actual position of each light-emitting diode may be adjusted relative to the rectangular-grid position for that light-emitting diode.

Figure 40:
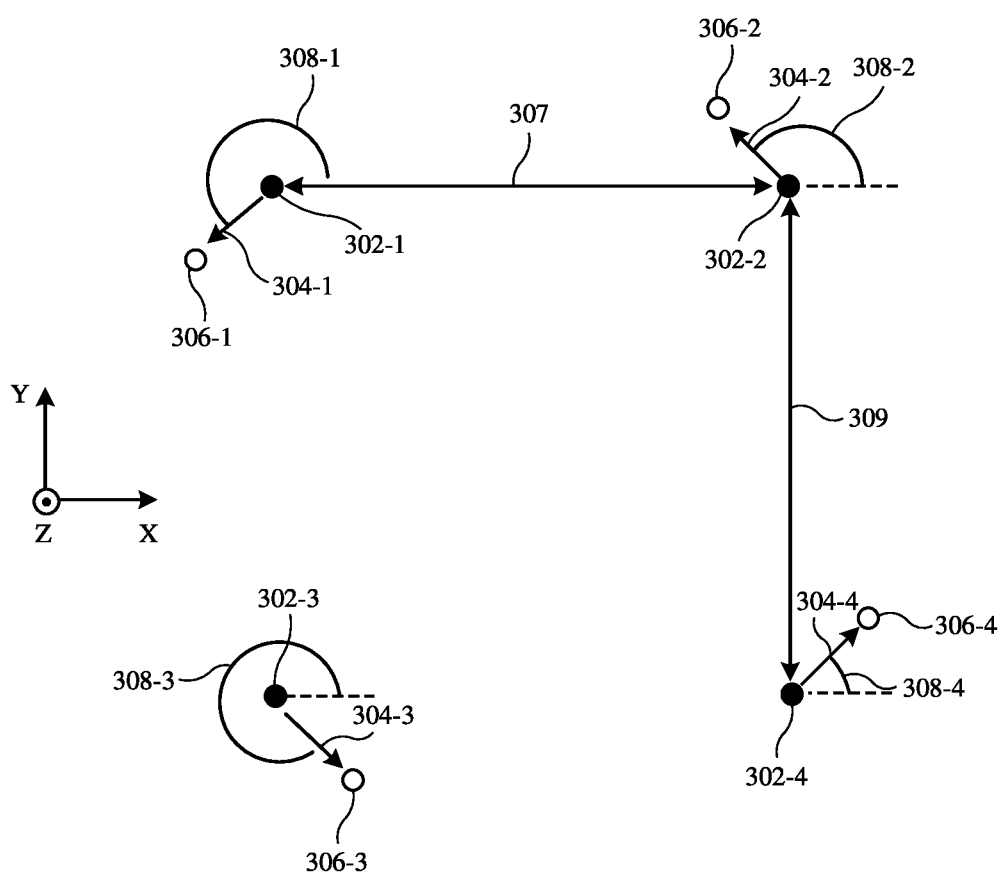
FIG. 40 is a diagram showing how the positions of light-emitting diodes in a backlight may be dithered to improve performance of the display in accordance with an embodiment.

FIG. 40 is a diagram showing how the positions of light-emitting diodes may be dithered to improve performance of the display. FIG. 40 shows rectangular grid positions 302-1, 302-2, 302-3, and 302-4. The rectangular grid positions may be positions associated with a regularly spaced grid that extends across the entire display (e.g., each rectangular grid position is part of a row of rectangular grid positions that extends across the entire display and each rectangular grid position is part of a column of rectangular grid positions that extends across the entire display). Light-emitting diodes may optionally be mounted at each rectangular grid position (similar to as in FIG. 3). Alternatively, to mitigate visible artifacts caused by this arrangement the light-emitting diodes may be offset from the rectangular grid positions as shown in FIG. 40.

In FIG. 40, each light-emitting diode may be positioned at a position that is offset relative to its corresponding rectangular grid position. For example, a light-emitting diode may be located at position 306-1 that is moved by offset distance 304-1 away from rectangular grid position 302-1. Offset distance 304-1 is at an angle 308-1 relative to the X-axis. Similarly, a light-emitting diode may be located at position 306-2 that is moved by offset distance 304-2 away from rectangular grid position 302-2. Offset distance 304-2 is at an angle 308-2 relative to the X-axis. A light-emitting diode may be located at position 306-3 that is moved by offset distance 304-3 away from rectangular grid position 302-3. Offset distance 304-3 is at an angle 308-3 relative to the X-axis. A light-emitting diode may be located at position 306-4 that is moved by offset distance 304-4 away from rectangular grid position 302-4. Offset distance 304-4 is at an angle 308-4 relative to the X-axis.

Each offset distance may have any desired magnitude. In one example, the offset distance may be greater than 0, may be shorter than a distance between adjacent rectangular grid positions in the same row (e.g., distance 307), and may be shorter than a distance between adjacent rectangular grid positions in the same column (e.g., distance 309). Each offset distance may be the same (e.g., offset distances 304-1, 304-2, 304-3, and 304-4 may all have the same magnitude) or one or more of the offset distances may be different (e.g., offset distances 304-1, 304-2, 304-3, and 304-4 may all have different magnitudes). In some cases, the offset distances may be random or pseudo-random.

Similarly, each offset distance may be moved away from its corresponding rectangular grid position by any desired angle. In one illustrative example, each angle is 90 degrees offset from the angle associated with the light-emitting diode in an adjacent row or column. As shown in FIG. 40, angle 304-4 may be a given angle (e.g., $\theta$) between 0 degrees and 90 degrees, angle 304-2 may be offset by 90 degrees relative to the given angle (e.g., angle 304-2=$\theta$+90 degrees), angle 304-1 may be offset by 180 degrees relative to the given angle (e.g., angle 304-1=$\theta$+180 degrees), and angle 304-3 may be offset by 270 degrees relative to the given angle (e.g., angle 304-3=$\theta$+270 degrees). Effectively, the 2×2 group of light-emitting diodes is rotated relative to the rectangular grid positions. Each 2×2 group of light-emitting diodes within the display may be independently rotated. The example of using a 2×2 group is merely illustrative. Light-emitting diode groups of any desired size may be rotated across the display.

Each light-emitting diode position 306 may be offset from its rectangular grid position 302 by an angle that is 180 degrees different than the light-emitting diode position of a diagonally adjacent light-emitting diode. Each light-emitting diode position 306 may be offset from its rectangular grid position 302 by an angle that is 90 degrees different than the light-emitting diode position of a horizontally adjacent light-emitting diode (e.g., a light-emitting diode in the same row). Each light-emitting diode position 306 may be offset from its rectangular grid position 302 by an angle that is 90 degrees different than the light-emitting diode position of a vertically adjacent light-emitting diode (e.g., a light-emitting diode in the same column).

This example is merely illustrative. In general, the location of each light-emitting diode and the rectangular grid position associated with that light-emitting diode may be offset by any desired angle. In some cases, the angles may be random or pseudo-random. It should be noted that each aforementioned light-emitting diode position may be the position of one light-emitting diode or multiple light-emitting diodes (e.g., when multiple light-emitting diodes are used in each cell as discussed in connection with FIG. 3).

Additionally, it should be noted that, to prevent mura caused by the light-emitting diodes 38, each light-emitting diode may emit light within a narrow wavelength range. For example, every light-emitting diode 38 in backlight unit 42 may emit light with a peak brightness at a wavelength of within a 2 nanometer range, within a 1.5 nanometer range, within a 1.0 nanometer range, within a 0.8 nanometer range, within a 0.75 nanometer range, within a 0.6 nanometer range, etc. Take the example where the light-emitting diodes emit blue light. In this example, every light-emitting diode 38 in backlight unit 42 may emit light with a peak brightness at a wavelength that is between (and including) 447.50 nanometers and 448.25 nanometers. In another example, every light-emitting diode 38 in backlight unit 42 may emit light with a peak brightness at a wavelength that is between (and including) 448.25 nanometers and 449.00 nanometers. In general, any desired wavelength range may be used. However, the range may be narrow to mitigate mura artifacts.

Figure 41:
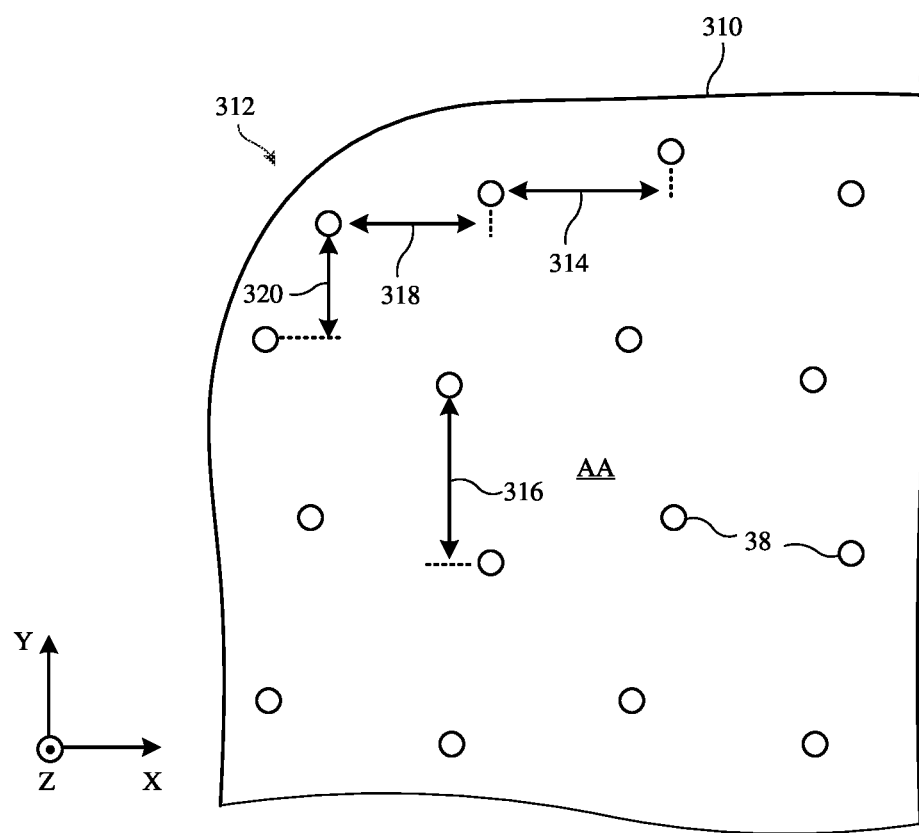
FIG. 41 is a top view of an illustrative light-emitting diode array showing how the pitch between the light-emitting diodes in a backlight may be reduced in a rounded corner area relative to non-rounded-corner areas in accordance with an embodiment.

FIG. 41 is a top view of an illustrative display with illustrative light-emitting diodes that are positioned according to a dithered grid. As shown, each light-emitting diode 38 is dithered with respect to a rectangular grid position (as shown in FIG. 40). In particular, each 2×2 group of light-emitting diodes are rotated relative to their rectangular grid positions. Therefore, the light-emitting diodes are not arranged in uniform rows and columns that extend across the entire display. Dithering the location of the light-emitting diodes in this way mitigates grid mura associated with the light-emitting diodes in a uniform rectangular grid. It should be noted that each light-emitting diode position in FIG. 41 may be the position of one light-emitting diode or multiple light-emitting diodes (e.g., when multiple light-emitting diodes are used in each cell as discussed in connection with FIG. 3).

As shown in FIG. 41, the active area AA may have an edge 310. If the same LED layout pattern is used across the entire active area, the rounded corner 312 may have a dimmer appearance than the remaining portions of the backlight. To mitigate non-uniformity in the rounded corners of the active area, the pattern may be adjusted in the rounded corners to increase the brightness in the rounded corners and match the brightness of the rest of the backlight.

In the majority of the LED array (e.g., in the non-rounded-corner areas), the LEDs may be separated by a pitch 314 in the X-direction and a pitch 316 in the Y-direction. Distances 314 and 316 may each be less than 100 millimeters, less than 10 millimeters, less than 5 millimeters, less than 4 millimeters, less than 3 millimeters, less than 2 millimeters, greater than 1 millimeter, greater than 2 millimeters, between 2 and 3 millimeters, etc. Distance 316 may be slightly smaller than distance 314 (e.g., less than 5% different, less than 1% different, etc.) in one possible arrangement. In general, any desired distances 314 and 316 may be used.

In the rounded-corner areas, the LEDs may be separated by a pitch 318 in the X-direction and a pitch 320 in the Y-direction. Pitch 318 in the rounded corner area is less than pitch 314 in the non-rounded-corner area. Pitch 320 in the rounded corner area is less than pitch 316 in the non-rounded-corner area. Pitch 318 may be less than pitch 314 by at least 1%, at least 5%, at least 10%, at least 20%, at least 30%, at least 40%, etc. Pitch 320 may be less than pitch 316 by at least 1%, at least 5%, at least 10%, at least 20%, at least 30%, at least 40%, etc. Distances 318 and 320 may each be less than 100 millimeters, less than 10 millimeters, less than 5 millimeters, less than 4 millimeters, less than 3 millimeters, less than 2 millimeters, less than 1.5 millimeters, less than 1 millimeter, greater than 1 millimeter, greater than 2 millimeters, between 1.5 and 2.5 millimeters, between 1 and 1.5 millimeters, etc.

The LEDs closest to the edge 310 of the active area (in both the rounded corner areas and along the straight edges of the active area) may be separated from edge 310 by less than 1 millimeter in the X-direction, less than 0.8 millimeters in the X-direction, less than 0.6 millimeters in the X-direction, etc. The LEDs closest to the edge 310 of the active area (in both the rounded corner areas and along the straight edges of the active area) may be separated from edge 310 by less than 1 millimeter in the Y-direction, less than 0.8 millimeters in the Y-direction, less than 0.6 millimeters in the Y-direction, etc.

Figure 42:
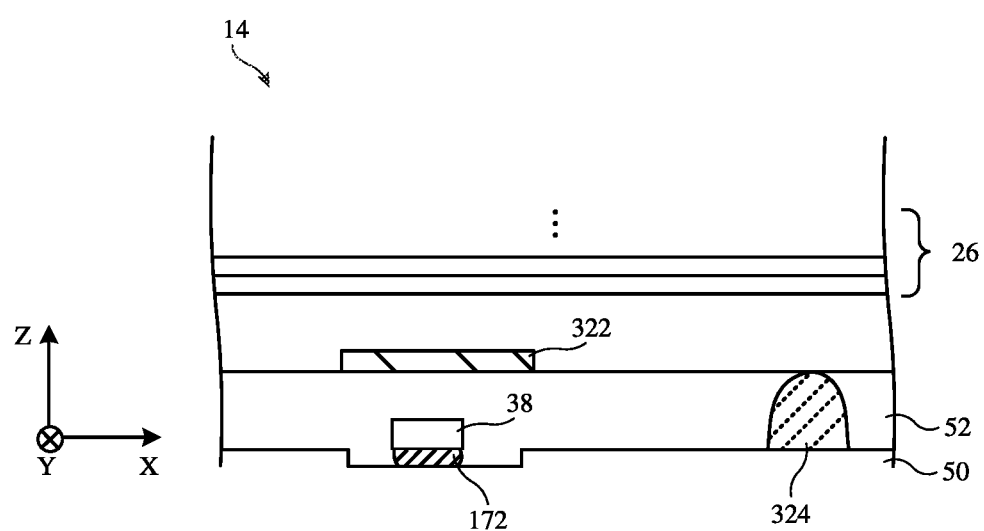
FIG. 42 is a cross-sectional side view of an illustrative display showing how a reflective layer may be patterned on encapsulant for the backlight unit in accordance with an embodiment.

FIG. 42 is a cross-sectional side view of an illustrative display with reflective ink patterned on the encapsulant. As shown, LED 38 is attached to printed circuit 50 (e.g., an exposed portion of conductive layer 162-1 as shown in FIG. 28) using solder 172. Encapsulant 52 overlaps and conforms to the array of LEDs 38.

To mitigate hot-spots in the backlight unit, reflective ink 322 may be patterned on top of the encapsulant 52. The reflective ink helps avoid a bright spot directly over LEDs 38 in the backlight. A discrete portion of reflective ink 322 may overlap each LED 38 in the array of LEDs. Reflective ink 322 may be a white ink having a reflectivity that is greater than 50%, greater than 70%, greater than 80%, greater than 90%, between 70% and 90%, between 70% and 95%, between 85% and 95%, etc. The patterned reflective ink may have any desired footprint when viewed from above (e.g., circular, non-square rectangular, square, etc.). Each portion of patterned reflective ink 322 may have a diameter/width that is greater than 300 microns, greater than 500 microns, greater than 600 microns, greater than 800 microns, greater than 1000 microns, greater than 1300 microns, less than 1500 microns, less than 1300 microns, less than 1000 microns, less than 800 microns, less than 600 microns, between 500 microns and 1500 microns, between 500 microns and 700 microns, between 900 microns and 1100 microns, etc. The center-to-center displacement between each portion of reflective ink 322 and the respective light-emitting diode that ink portion overlaps may be less than 1000 microns, less than 750 microns, less than 600 microns, less than 500 microns, less than 400 microns, less than 300 microns, etc. The total area of encapsulant 52 covered by reflective layer 322 (within the active area) may be less than 15%, less than 10%, less than 5%, less than 3%, greater than 1%, between 1% and 15%, between 1% and 10%.

Optical films 26 may be formed over encapsulant 52 and reflective ink 322. If desired, an optional support structure 324 may be included on printed circuit board 50 between adjacent LEDs 38 within the LED array. Support structure 324 may be used to maintain the structural integrity of encapsulant slab 52 (which has a planar upper surface). Support structure 324 may have a low coefficient of thermal expansion (e.g., lower than the encapsulant) to ensure it is not adversely affected by temperature changes associated with operation of the light-emitting diodes.

Support structure 324 may not affect the light emitted from the light-emitting diodes. In other words, support structure 324 may be formed from a transparent material that has the same index-of-refraction as the surrounding encapsulant slab 52 (e.g., support structure 324 is index-matched to slab 52). Support structure 324 will therefore not influence the path or intensity of the light emitted from light-emitting diodes 38. Support structure 324 may therefore have any desired shape (since the shape will not affect the optical performance of the display). In the example of FIG. 42, support structure 324 has a curved upper surface (e.g., a dome-shape).

As another alternative, support structure 324 may reflect light from light-emitting diodes 38. Support structure 324 may be formed from a reflective material (e.g., a white structure, metal structure, etc.). Alternatively, support structure 324 may be formed from a transparent material that has an index-of-refraction that is different than the index-of-refraction of encapsulant layer 52. The index-of-refraction difference may be sufficient (e.g., greater than 0.1, greater than 0.2, greater than 0.3, etc.) for total internal reflection (TIR) to occur when light from light-emitting diodes 38 reaches support structure 324. Support structure 324 may have a shape that is selected to redirect light upwards towards the viewer.

When reflective ink 322 is included on the encapsulant, support structure 324 may be omitted from the backlight. Alternatively, support structure 324 may be index-matched to the encapsulant 52 so that the support structure provides mechanical strength but does not provide optical functionality. As yet another alternative, a reflective support structure 324 may be included even when reflective ink 322 is included on the encapsulant.

Including reflective ink 322 as in FIG. 42 may allow for one or more optical films 26 to be omitted from the backlight unit, mitigating the thickness, cost, and complexity of the backlight unit. For example, when reflective ink 322 is used, instead of 6 optical films being included between the LED array and the pixel array (e.g., as in FIG. 4), 5 optical films, 4 optical films, or fewer than 4 optical films may be included between the LED array and the pixel array. As an example, two of the three light spreading layers 28-1, 28-2, and 28-3 in FIG. 4 may be omitted when reflective ink 322 is used.

The foregoing is merely illustrative and various modifications can be made to the described embodiments. The foregoing embodiments may be implemented individually or in any combination.

What is claimed is:

1. A display, comprising:
   a plurality of pixels; and
   a backlight configured to produce backlight illumination for the plurality of pixels, wherein the backlight comprises:
      a printed circuit board having first and second opposing edges;
      an array of light-emitting diodes mounted on the printed circuit board;
      a plurality of electronic components mounted on the printed circuit board along the first edge;
      a chassis having a portion mounted on the printed circuit board along the second edge; and
      optical films formed over the printed circuit board that receive light from the array of light-emitting diodes, wherein at least one of the optical films is attached to the portion of the chassis along the second edge and supported by the printed circuit board along the first edge.

2. The display defined in claim 1, wherein the portion of the chassis is a first portion, wherein the printed circuit board has third and fourth opposing edges that extend between the first and second opposing edges, wherein the chassis has a second portion mounted on the printed circuit board along the third edge, and wherein the chassis has a third portion mounted on the printed circuit board along the fourth edge.

3. The display defined in claim 2, wherein the chassis does not have a portion mounted on the printed circuit board along the first edge between the third and fourth edges.

4. The display defined in claim 2, wherein the chassis has a C-shaped footprint.

5. The display defined in claim 2, wherein the first portion of the chassis has a protruding portion that forms a shelf and wherein the at least one of the optical films is attached to the shelf.

6. The display defined in claim 5, wherein the at least one of the optical films attached to the shelf is a color conversion layer.

7. The display defined in claim 5, wherein the shelf extends along the entire first portion of the chassis and wherein the at least one of the optical films is attached to the shelf with a strip of adhesive that extends along the entire first portion of the chassis.

8. The display defined in claim 7, wherein the shelf has a surface that is plane parallel to a lower surface of the first portion of the chassis, that is plane parallel to an upper surface of the first portion of the chassis, and that is interposed between the lower and upper surfaces of the first portion of the chassis.

9. The display defined in claim 1, wherein the backlight further comprises:
   a first layer of adhesive that attaches the chassis to an upper surface of the printed circuit board.

10. The display defined in claim 9, wherein the backlight further comprises:
    a second layer of adhesive that attaches the at least one optical film to the portion of the chassis.

11. The display defined in claim 1, wherein the array of light-emitting diodes is interposed between the plurality of electronic components and the portion of the chassis.

12. The display defined in claim 1, wherein every light-emitting diode in the array of light-emitting diodes emits light at a peak brightness at a wavelength within a 1 nanometer range of wavelengths.

13. The display defined in claim 1, wherein the backlight further comprises:
    a layer of encapsulant that is formed over the array of light-emitting diodes; and a patterned reflective layer that is formed directly on an upper surface of the layer of encapsulant, wherein the patterned reflective layer has a plurality of discrete portions, wherein each discrete portion overlaps a respective light-emitting diode in the array of light-emitting diodes, and wherein the patterned reflective layer has a reflectance that is greater than 70%.

14. A display, comprising:
a plurality of pixels; and
a backlight configured to produce backlight illumination for the plurality of pixels, wherein the backlight comprises:
  a printed circuit board having first and second opposing edges;
  an array of light-emitting diodes mounted on the printed circuit board;
  a plurality of electronic components mounted on the printed circuit board along the first edge;
  optical films formed over the printed circuit board that receive light from the array of light-emitting diodes; and
  a stiffener that is formed underneath the printed circuit board, that wraps around the first edge of the printed circuit board, and that at least partially supports the plurality of pixels.

15. The display defined in claim 14, wherein the stiffener is formed from stainless steel.

16. The display defined in claim 14, wherein the backlight further comprises:
  an additional printed circuit board, wherein the stiffener is interposed between the printed circuit board and the additional printed circuit board;
  a flexible printed circuit board that is attached between the additional printed circuit board and the plurality of pixels; and
  a timing controller that is mounted on the flexible printed circuit board.

17. The display defined in claim 16, wherein at least 80% of the footprint of the additional printed circuit board is overlapped by the stiffener.

18. The display defined in claim 14, wherein the stiffener has a first portion above the plurality of electronic components that is overlapping with the plurality of electronic components, a second portion below the plurality of electronic components that is overlapping with the plurality of electronic components, and a third portion that connects the first and second portions.

19. A display having an active area and an inactive area, comprising:
  a plurality of pixels; and
  a backlight configured to produce backlight illumination for the plurality of pixels, wherein the backlight comprises:
    a printed circuit board;
    an array of light-emitting diodes mounted on the printed circuit board in the active area, wherein the active area has four rounded corners, wherein, in non-rounded-corner areas of the active area, the light-emitting diodes are separated by a first pitch in a first direction and a second pitch in a second direction, wherein, in the four rounded corners of the active area, the light-emitting diodes are separated by a third pitch in the first direction and a fourth pitch in the second direction, wherein the third pitch is less than the first pitch, and wherein the fourth pitch is less than the second pitch; and
    optical films formed over the printed circuit board that receive light from the array of light-emitting diodes.

20. The display defined in claim 14, wherein the stiffener has a first portion below the plurality of electronic components that is overlapping with the plurality of electronic components and a second portion along the first edge and wherein the second portion extends orthogonally to the first portion.

* * * * *